United States Patent
Dandrea et al.

(10) Patent No.: US 7,165,140 B2
(45) Date of Patent: *Jan. 16, 2007

(54) QUEUING ARCHITECTURE INCLUDING A PLURALITY OF QUEUES AND ASSOCIATED METHOD FOR CONTROLLING ADMISSION FOR DISK ACCESS REQUESTS FOR VIDEO CONTENT

(75) Inventors: Robert G. Dandrea, Newtown, PA (US); Danny Chin, Princeton Jct., NJ (US); Jesse S. Lerman, Princeton, NJ (US); Clement G. Taylor, Watertown, MA (US); James Fredrickson, Princeton, NJ (US)

(73) Assignee: Sedna Patent Services, LLC, Philadelphia, PA (US)

( * ) Notice: Subject to any disclaimer, the term of this patent is extended or adjusted under 35 U.S.C. 154(b) by 223 days.

This patent is subject to a terminal disclaimer.

(21) Appl. No.: 10/663,237

(22) Filed: Sep. 16, 2003

(65) Prior Publication Data

US 2004/0064640 A1 Apr. 1, 2004

Related U.S. Application Data

(63) Continuation of application No. 09/801,021, filed on Mar. 7, 2001, now Pat. No. 6,691,208, which is a continuation-in-part of application No. 09/268,512, filed on Mar. 12, 1999, now Pat. No. 6,378,036.

(60) Provisional application No. 60/220,776, filed on Jul. 25, 2000.

(51) Int. Cl.
*G06F 12/00* (2006.01)
(52) U.S. Cl. ..................................... 711/114

(58) Field of Classification Search ................. 711/114
See application file for complete search history.

(56) References Cited

U.S. PATENT DOCUMENTS

| | | | |
|---|---|---|---|
| 5,220,653 A | 6/1993 | Miro | 709/107 |
| 5,528,513 A * | 6/1996 | Vaitzblit et al. | 718/103 |
| 5,530,912 A * | 6/1996 | Agrawal et al. | 455/450 |
| 5,561,456 A | 10/1996 | Yu | 725/97 |
| 5,581,778 A | 12/1996 | Chin et al. | 712/16 |

(Continued)

OTHER PUBLICATIONS

Lin, "Optimal Real-Time Admission Control Algorithms for the Video On-Demand (VOD) Service," IEEE Trans. on Broadcasting, vol. 44, No. 4, Dec. 1998, pp. 402-408.

(Continued)

*Primary Examiner*—Hyung Sough
*Assistant Examiner*—Duc T. Doan
(74) *Attorney, Agent, or Firm*—Patterson & Sheridan, LLP

(57) ABSTRACT

A queuing architecture and method for scheduling disk drive access requests in a video server. The queuing architecture employs a controlled admission policy that determines how a new user is assigned to a specific disk drive in a disk drive array. The queuing architecture includes, for each disk drive, a first queue for requests from users currently receiving information from the server, and a second queue for all other disk access requests, as well as a queue selector selecting a particular first queue or second queue for enqueuing a request based on the controlled admission policy. The controlled admission policy defines a critical time period such that if a new user request can be fulfilled without causing a steady-state access request for a particular disk drive to miss a time deadline, the new user request is enqueued in the second queue of the particular disk drive; otherwise, the controlled admission policy enqueues the new user request in a second queue of another disk drive.

8 Claims, 14 Drawing Sheets

U.S. PATENT DOCUMENTS

| | | |
|---|---|---|
| 5,610,841 A | 3/1997 | Tanaka et al. ............... 725/87 |
| 5,644,786 A | 7/1997 | Gallagher et al. ............ 710/39 |
| 5,671,377 A | 9/1997 | Bleidt et al. ................. 345/723 |
| 5,687,390 A | 11/1997 | McMillan, Jr. ............... 710/5 |
| 5,721,956 A | 2/1998 | Martin et al. ................ 710/52 |
| 5,787,482 A | 7/1998 | Chen et al. ................. 711/158 |
| 5,802,394 A | 9/1998 | Baird et al. ................. 710/5 |
| 5,870,629 A | 2/1999 | Bordon et al. ............... 710/44 |
| 5,926,458 A | 7/1999 | Yin ............................ 370/230 |
| 5,926,649 A * | 7/1999 | Ma et al. ..................... 710/6 |
| 5,928,327 A | 7/1999 | Wang et al. ................. 725/88 |
| 5,991,812 A | 11/1999 | Srinivasan .................. 709/232 |
| 6,021,464 A * | 2/2000 | Yao et al. .................... 711/114 |
| 6,023,720 A | 2/2000 | Aref et al. ................... 709/103 |
| 6,061,504 A | 5/2000 | Tzelnic et al. ............... 711/113 |
| 6,253,375 B1 | 6/2001 | Gordon et al. ............... 725/88 |
| 6,378,036 B1 | 4/2002 | Lerman et al. .............. 711/112 |
| 6,434,631 B1 | 8/2002 | Bruno et al. ................. 710/6 |
| 6,721,789 B1 * | 4/2004 | DeMoney ................... 709/219 |

OTHER PUBLICATIONS

Vin et al., "A Statistical Admission Control Algorithm For Multimedia Servers," Proceedings of the Second ACM Int'l Conf. on Multimedia, Oct. 1994, pp. 33-40.

Worthington et al., "Scheduling Algorithms for Modern Disk Drives," ACM Sigmetrics Performance Evaluation Review, Proceedings of the 1994 Conference on Measurement and Modeling of Computer Systems, May 1994, vol. 22, Issue 1, pp. 241-251.

Abbott et al., "Scheduling I/O Requests with Deadlines: a Performance Evaluation," Proceedings 11th Real-time Systems Symposium, 1990, pp. 113-124.

Pan et al, "A Time-Scale Dependent Disk Scheduling Scheme For Multimedia On Demand Servers," IEEE Proceedings of the Third IEEE Int'l. Conf. on Multimedia Computing and Systems, Jun. 17-23, 1996, pp. 572-579.

Lee et al., "Adaptive Disk Scheduling Algorithms For Video Servers," Proceedings 1999 Int'l. Conf. on Parallel Processing, Sep. 21-24, 1999, pp. 363-370.

* cited by examiner

QUEUING ARCHITECTURE INCLUDING A PLURALITY OF QUEUES AND ASSOCIATED METHOD FOR CONTROLLING ADMISSION FOR DISK ACCESS REQUESTS FOR VIDEO CONTENT

CROSS-REFERENCE TO RELATED APPLICATIONS

This application is a continuation of U.S. patent application Ser. No. 09/801,021, filed Mar. 7, 2001, now U.S. Pat. No. 6,691,208, entitled "QUEUING ARCHITECTURE INCLUDING A PLURALITY OF QUEUES AND ASSOCIATED METHOD FOR CONTROLLING ADMISSION FOR DISK ACCESS REQUESTS FOR VIDEO CONTENT," which is a continuation-in-part of U.S. patent application Ser. No. 09/268,512, filed Mar. 12, 1999, now U.S. Pat. No. 6,378,036, issued Apr. 23, 2002, entitled "STATISTICAL DISK SCHEDULING FOR VIDEO SERVERS," and claims benefit of U.S. Provisional Application Ser. No. 60/220,776, filed Jul. 25, 2000; all of which applications are hereby incorporated by reference.

FIELD OF THE INVENTION

The invention relates to methods of scheduling disk access requests in a video server, and, more particularly, to statistical scheduling methods that improve the effective disk bandwidth provided by video servers.

BACKGROUND OF THE DISCLOSURE

Video-on-demand systems allow subscribers to request video programs from a video library at any time for immediate viewing in their homes. Subscribers submit requests to a video service provider via a communication channel (e.g., telephone lines or a back channel through the distribution network that carries the video to the subscriber's home), and the requested video program is routed to the subscriber's home via telephone or coaxial television lines. In order to provide such movie-on-demand services, video service providers use a video server to process subscriber requests, retrieve the requested programs from storage, and distribute the programs to the appropriate subscriber(s). One exemplary system for providing video-on-demand services is described in commonly assigned U.S. Pat. No. 6,253,375, issued Jun. 26, 2001, which is incorporated herein by reference.

In order for video servers to provide good performance, it is crucial to schedule video storage (disk) access requests such that disk bandwidth is maximized. Also, once a subscriber is watching a program, it is imperative to continuously deliver program content to the subscriber without interruption. In addition to distributing content to subscribers, disk bandwidth in a video server is typically also utilized for operations such as loading content, disk maintenance, and file system meta-data synchronizing. Disk bandwidth may also be reserved for reducing latency in data transfer to subscribers. The number of subscribers that can be properly served concurrently by a video server therefore depends on effective disk bandwidth, which in turn depends on how disk access requests are scheduled.

One of the problems facing current disk scheduling methods is the potential variation in time required to service disk accesses. For example, the internal transfer rate of a SEAGATE CHEETAH™ disk varies from 152 Megabits per second (Mbps) on inner tracks to 231 Mbps on outer tracks, and the seek time can vary from 0 milliseconds (ms) to 13 ms depending on how far apart the segments of data are from one another. Given these variations in seek and transfer times and the fact that the server may contain sixteen or more disk drives, it is difficult to determine the effective disk bandwidth of a video server. As a result, current disk scheduling methods allocate a fixed amount of time for every disk access request, regardless of whether the access finishes early. This results in a deterministic system in which the available disk bandwidth is known, but since the fixed amount of time must be large enough to accommodate a worst-case disk access, disk bandwidth is wasted.

Therefore, there is a need in the art for a method and apparatus for scheduling disk access requests in a video server without allocating worst-case access times, thus improving disk bandwidth utilization.

SUMMARY OF THE INVENTION

The disadvantages associated with the prior art are overcome by a method of the present invention, called Statistical Disk Scheduling (SDS), which exploits the fact that disk access times are on average significantly less than the worst case access time. The SDS finds use in improving video server functionality by increasing the bandwidth utilization of the storage medium in the following manner: worst case performance is used for priority operations (e.g., user read operations) but the bandwidth created by better than worst case performance is used for non-priority operations such as loading content onto the disk drives and disk maintenance. As a result, bandwidth for loading content and disk maintenance, or file system meta-data synchronizing does not have to be specifically reserved, thus increasing the number of users that can be served simultaneously by the video server.

SDS maintains at least two queues and a queue selector. The first queue is an access request queue for access requests from a current user that is presently viewing a program and the second queue is for all other forms of access requests. The second queue may comprise multiple queues to provide a queuing hierarchy. The requests are ordered in each of the queues to optimize the bandwidth and ensure that the data to the current users is not interrupted such that a display anomaly occurs. The queue selector identifies the queue that will supply the next access request to a disk queue. The selected requests are sent to the disk queues for execution. The disk queues are generally located on the disk drives and are generally not accessible except to place a request in the queue for each disk drive. The requests are then executed on a first-in, first-out manner (FIFO). In effect, the invention defers disk use to the latest possible moment because once the request is in the disk queue it is more difficult to change. The inventive queue structure provides opportunities to alter the disk access requests and their execution order prior to sending the requests to the disk queue. If a disk queue is not used, i.e., the disk drive does not have an internal queue, then the access requests are sent one at a time from the SDS to the disk drive for execution.

More specifically, the preferred embodiment of the SDS maintains three queues for each disk based on the type and priority of disk access requests, and a queue selector for managing queue selection. Selected requests are forwarded from the three queues to the disk such that bandwidth utilization is maximized, while giving highest priority to subscribers currently viewing a program so that their program streams are generally not interrupted. (Subscribers currently viewing a program are referred to as "steady-state"

subscribers.) SDS dynamically monitors bandwidth utilization to determine when lower-priority requests can be scheduled without affecting on-time completion of the higher priority steady-state subscriber requests. In order to keep the disks busy and maximize disk bandwidth utilization, disk command queuing may be employed to ensure that the disk can begin seeking for the next access immediately after it finishes the data transfer for the current disk access.

Furthermore, popular content is migrated to the faster (outer) tracks of the disk drives to reduce the average access time and improve performance.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
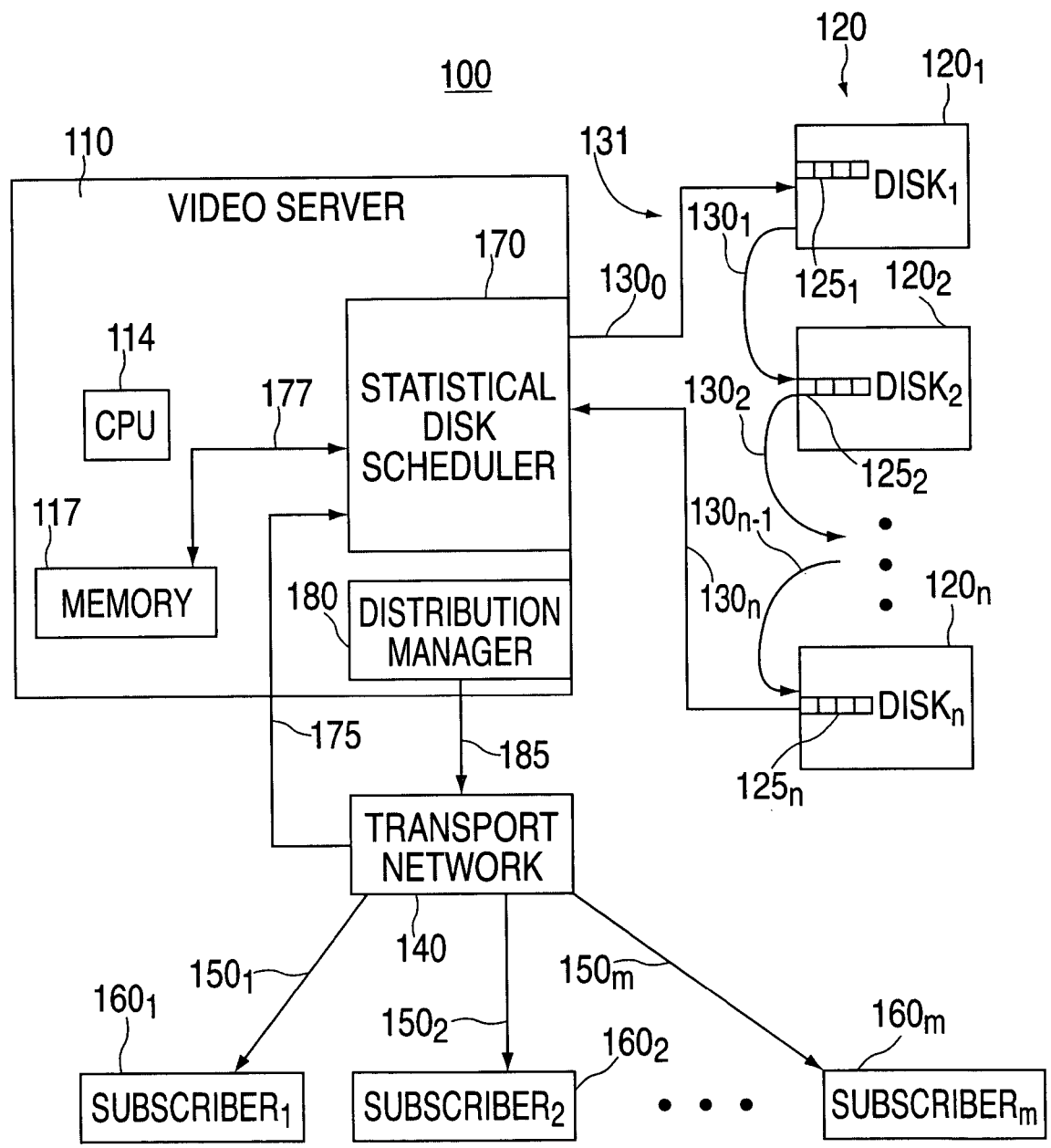
FIG. 1 depicts a high-level block diagram of a video-on-demand system that includes a video server incorporating the present invention.

FIG. 1 depicts a video-on-demand system that utilizes a video server incorporating the teachings of the present invention. Specifically, video-on-demand system 100 contains a video server 110 that communicates with a plurality of disks $120_1$ through $120_n$ (collectively disks 120) via a Statistical Disk Scheduler (SDS) 170. In addition to the SDS 170, video server 110 contains a central processing unit (CPU) 114 and memory element 117. SDS 170 is coupled to disks 120 by paths $130_0$ through $130_n$ (collectively paths 130) (e.g., fiber channel), and to memory 117 by data path 177. The video server sends access requests along paths 130 to disks 120, and each disk 120 has its own internal queue $125_1$ through $125_n$ (collectively queues 125) for buffering access requests. Data read from the disks are transmitted back to the video server along paths 130. The paths 130 are serially coupled, i.e., "daisy chained" to form a data transfer loop 131, e.g., a fiber channel loop. Although one loop is depicted, multiple loops may be employed to interconnect subsets of the disk drives such that the data transfer rate amongst the disk drives and the video server is increased over that of a single loop system. The video server contains a Distribution Manager 180 that receives the data transmitted along paths $130_n$ and loop 131 and distributes this data to subscribers $160_1$ through $160_m$ (collectively subscribers 160), via a transport network 140. Additionally, disks 120 send messages called command completion messages (to be discussed later) to the SDS 170 along paths 130.

The transport network 140 is typically, but not exclusively, a conventional bi-directional hybrid fiber-coaxial cable network. Subscribers 160 are coupled to the transport network 140 by paths $150_1$ through $150_n$ (collectively transport network paths 150) (e.g., coaxial cable). Additionally, transport network 140 forwards subscriber access requests along path 175 to the SDS 170, and receives video data from Distribution Manager 180 via path 185.

Commonly assigned U.S. Pat. No. 6,253,375, issued Jun. 26, 2001, which is incorporated herein by reference, describes an information distribution system, known as the ONSETS system, that uses a video server that may benefit from the present invention. Additionally, the video server of the ONSE™ system is described in U.S. Pat. Nos. 5,671,377 and 5,581,778 which are both herein incorporated by reference.

Figure 2:
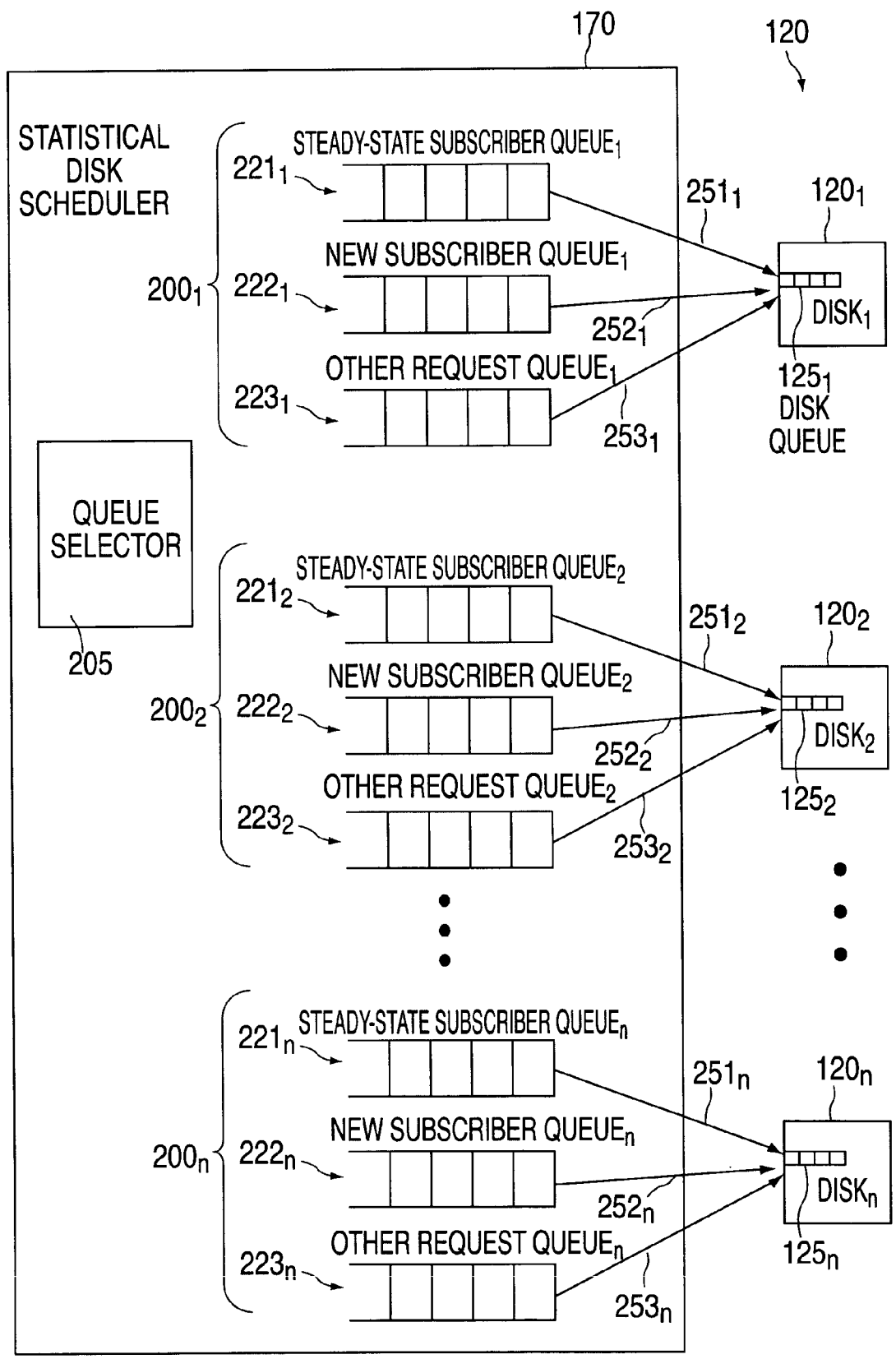
FIG. 2 depicts the queuing architecture of the Statistical Disk Scheduler used to perform the method of the present invention.

The SDS 170 performs the method of the present invention. FIG. 2 depicts a logical representation of the queuing architecture of the statistical disk scheduler (SDS). In a physical representation, the outputs of each queue are connected to the data loop (131 of FIG. 1). In the depicted embodiment, the SDS queuing architecture contains three queues for each disk 120 and a queue selector 205 for managing queue selection, i.e., the queue selector determines which queue is to receive the next access request for a disk drive. For simplicity, the logical representation is more easily understandable. Although FIG. 2 depicts three queues for each disk drive, a greater or lesser number of queues may be used to fulfill the invention, i.e., at least two queues should be used; one for the "steady-state" requests and one for all other requests.

In the three queue embodiment of the SDS 170, a steady-state subscriber queue (SSQ) $221_1$ through $221_n$ (collectively steady-state subscriber queues 221) is used for "steady-state" subscriber disk reads for active streams (i.e., continuous content retrieval for distribution to subscribers currently watching a program.) Disk access requests in SSQ 221 are assigned the highest priority. A new subscriber queue (NSQ) $222_1$ through $222_n$ (collectively new subscriber queues 222) is for subscriber requests to begin viewing a program or perform other program related commands, i.e., non-steady state commands such as fast forward or rewind that in essence are a request for a new data stream. Disk access requests in NSQ 222 are assigned medium priority. The other request queue (ORQ) $223_1$ through $223_n$ (collectively other request queues 223) is for all non-subscriber operations, such as loading content, disk maintenance, and file system meta-data synchronizing. Disk access requests in ORQ 223 are assigned the lowest priority.

Queues $221_n$, $222_n$, and $223_n$ are collectively called the SDS queues $200_n$, where n is an integer greater than zero that represents a disk drive $120_n$ in an array of disk drives 120. For each disk $120_n$, the queue selector 205 selects requests from the three SDS queues $221_n$, $222_n$, and $223_n$ and forwards the requests to the corresponding disk queue $125_n$ via paths $251_1$ to $251_n$, $252_1$ to $251_n$, and $253_1$ to $253_n$, respectively. Each request has an associated worst-case access time based on the type of request and data transfer size. The worst-case access time can be fixed, or dynamically computed based on prior access time statistics. Additionally, each steady-state subscriber request has a time deadline for when the request must complete in order to guarantee continuous video for that subscriber. Disk requests in the NSQ and ORQ generally do not have time deadlines.

Requests in the SSQ $221_n$ are ordered by time deadline so that the request at the front of the queue has the earliest deadline. Consecutive SSQ requests with the same time deadline are ordered by logical disk block address according to an elevator algorithm. The elevator algorithm is a disk scheduling algorithm well-known in the art in which the disk head travels in one direction over the disk cylinders until there are no more requests that can be serviced by continuing in that direction. At this point, the disk head changes direction and repeats the process, thus traveling back and forth over the disk cylinders as it services requests. Since requests in the NSQ and ORQ do not generally have deadlines, they may be ordered on a first come first serve basis, or according to some other desired priority scheme.

In order to keep the disks 120 busy and maximize disk bandwidth utilization, disk command queuing may be employed to ensure that the disk can begin the seek for the next access immediately after it finishes the data transfer for the current disk access. When a steady-state request needs to access a sequence of multiple disks, the request is initially added to the SSQ $221_1$ of the first disk $120_1$. After this request is selected for servicing by the first disk $120_1$, the request is added to the second disk's SSQ $221_2$ as soon the video server begins sending the data that was recalled from the first disk $120_n$ to the subscriber. Steady-state requests are similarly added to the SSQ $221_n$ of each successive disk $120_n$.

The queue selector 205 employs an SDS Selection Procedure to select requests from the three SDS queues $200_n$ and forward the requests to an associated disk queue $125_n$ located within each of the disk drives $120_n$. The SDS Selection Procedure uses worst-case access times, request priorities, and time deadlines in determining which request to forward to the disk queue. The general strategy of the SDS Selection Procedure is to select a non-SSQ request only when such a selection will not cause any of the SSQ $221_n$ requests to miss their time deadlines, even if the non-SSQ request and all requests in the SSQ $221_n$ were to take their worst-case access times. If such a guarantee cannot be made, then the first request in the SSQ is always selected. As an optional step, once a request is selected, the SDS Selection Procedure checks whether the data for the selected read request is already in cache (if caching is used). If this is the case, the disk access request can be discarded and the Selection Procedure is repeated. Otherwise, the selected request is removed from the SDS queue $221_n$ and forwarded to an associated disk queue $125_n$.

Figure 3:
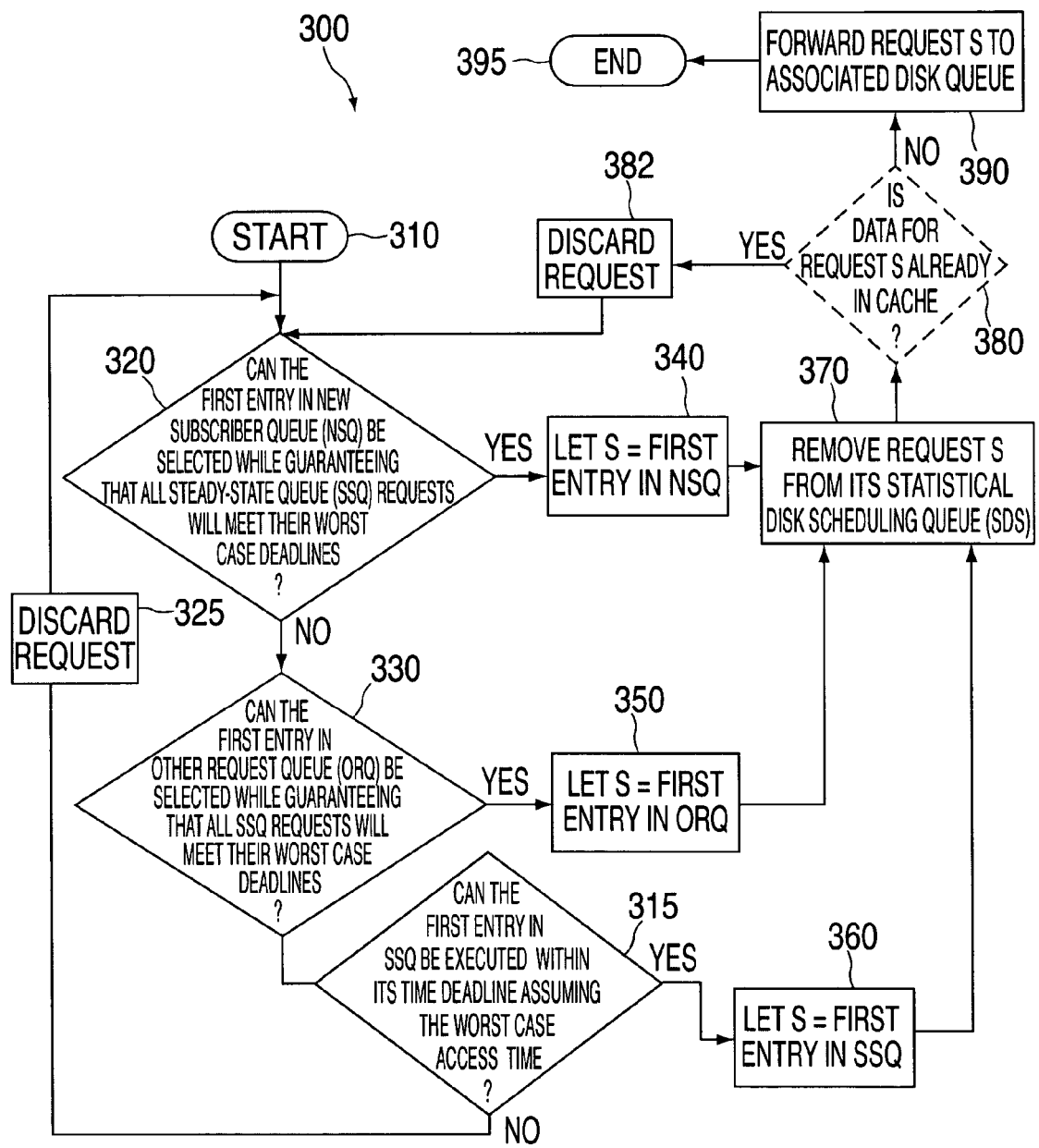
FIG. 3 depicts a flowchart specification of the SDS Selection Procedure.

FIG. 3 depicts a flow diagram of the SDS Selection Procedure 300. First, the Selection Procedure checks whether the first entry in the NSQ can be selected while guaranteeing that all SSQ requests will meet their time deadlines in the worst case (step 320), where worst case is defined by the system. Generally, the worst case value is the access value having a per user error rate that is acceptable.

Each queue maintains "a sum of the worst case values" selector that performs a worst case analysis and selects the queue that will be used (in steps 320 and 330 described below) to send the next command to the disk drive. The following pseudocode represents the operation of such a selector.

```
1)  perform worst case analysis
        returns remaining time (the amount of time left
        on the SSQ if all commands take worst case time
        to execute, if the SSQ is empty, the remaining
        time is infinity)
2)  if NSQ is !empty && NSQ.head.worstcase < remaining
    time
        take request off NRQ
    else if NSQ is empty && ORQ is !empty &&
        ORQ.head.worstcase < remaining time
        take request off ORQ
    else if SSQ is !empty
        take request off SSQ
        if request.deadline - request.worstcase >
        current time
            request missed deadline, terminate request,
            try selector again
else
    no requests pending
```

Preference is given to the NRQ over the ORQ, which only takes requests off the ORQ if the NSQ is empty.

The ORQ.head.worstcase and NSQ.head.worstcase are the respective worstcase access times to fulfill the next request in the ORQ and NSQ. The "remaining time" value is computed as follows:

remaining time=disk $Q$ Remaining Time ($SSQ_n$)− disk $Q$ worst case ($PQ_n$)

```
disk Q Remaining Time (Q, now) {
    sum = 0
    min = MAX
    for each entry in Q {
    sum + = entry → worstcase
    left = entry → deadline + sum − now;
    if (left < = 0 | | entry → deadline > now) { /*
    out of time */
    min = 0;
    break;
    }
    if (min > left)
    min = left; /* there is now less time remaining
    */
    }
    return min;
}
```

The worst case access time value may be dynamically computed or empirically measured to be a cut off time that defines a period in which accesses have an acceptable error rate. If the first entry fulfills the requirement in step 320, then this first entry is selected (step 340); otherwise, the Selection Procedure checks whether the first entry in the ORQ can be selected while guaranteeing that all SSQ requests will meet their time deadlines in the worst case (step 330). If so, then this first entry is selected (step 350); otherwise, the procedure proceeds to step 315, wherein the procedure queries whether the first entry in the SSQ can be executed within its time deadline assuming the worst case access time. If the request cannot be executed in time, the request is discarded at step 325 and the procedure returns to step 320.

If, however, the request can be executed in the allotted time in step 315, the first entry of the SSQ is selected at step 360. The selected request is then removed from its queue (step 370). Furthermore, if caching is used, the Selection Procedure checks whether data for the selected request is already in cache (step 380) (the caching step 380 is shown in phantom to represent that it is an optional step). If the request is cached, the selected request is discarded (step 382) and the Selection Procedure 300 is repeated (step 320). Otherwise, the selected request is forwarded to the associated disk queue (step 390).

The SDS executes the Selection Procedure during two scheduling events, called the scheduling interval and the command completion event. The scheduling interval is a fixed, periodic interval, while a command completion event occurs every time one of the disks completes a command. (Note that it is possible, although highly unlikely, that multiple disks complete a command simultaneously at a command completion event.) At each scheduling interval, a procedure called the Scheduling Interval Procedure is executed, and at each command completion event, a procedure called the Command Completion Procedure is executed. In the case that a scheduling interval and a command completion coincide, the Command Completion Procedure is executed first (i.e., the Command Completion Procedure is given priority over the Scheduling Interval Procedure). Alternatively, if the disk queue has a depth that is greater than one, then the execution priority of these routines is reversed. Such reversal leaves more time available to do other operations.

In the Scheduling Interval Procedure, steady-state requests are added to the next SSQ, if possible. (Recall that a steady-state request can be added to the next SSQ as soon as the data is output from the video server to the subscriber), and all SSQ are reordered to maintain correct time deadline order. The first entries in each of the SSQs are then sorted based on time deadlines, which determines the order with which the disks are serviced. For each disk, the Selection Procedure 300 is repeatedly executed as long as the associated disk queue is not full, at least one of the three SDS queues (SSQ, NSQ, ORQ) is not empty, and there is a request in one of the three SDS queues that satisfies the Selection Procedure criteria. For example, if in a three-Disk system when the disk queues are not full the first entry in Disk 1's SSQ has a time deadline of 35, the first entry in Disk 2's SS 5 has a time deadline of 28, and the first entry in Disk 3's SSQ has a time deadline of 39, then the disks would be serviced in the following order: Disk 2, Disk 1, Disk 3. Once the disk order has been established, then the SDS Selection Procedure is performed for each disk in that order.

Generally, in a video server application, the extents for the data are very long (e.g., hundreds of kilobytes) such that the disk queues have a depth of one. In other applications using shorter data extents, the disk queues may have various depths, e.g., five requests could be stored and executed in a first-in, first-out (FIFO) manner. The extent size is inversely proportioned to disk queue depth where data delivery latency is the driving force that dictates the use of a large extent size for video server applications. For other applications where the extent size is relatively small, the disk queue depth is dictated by the desire to reduce disk drive idle time.

Figure 4:
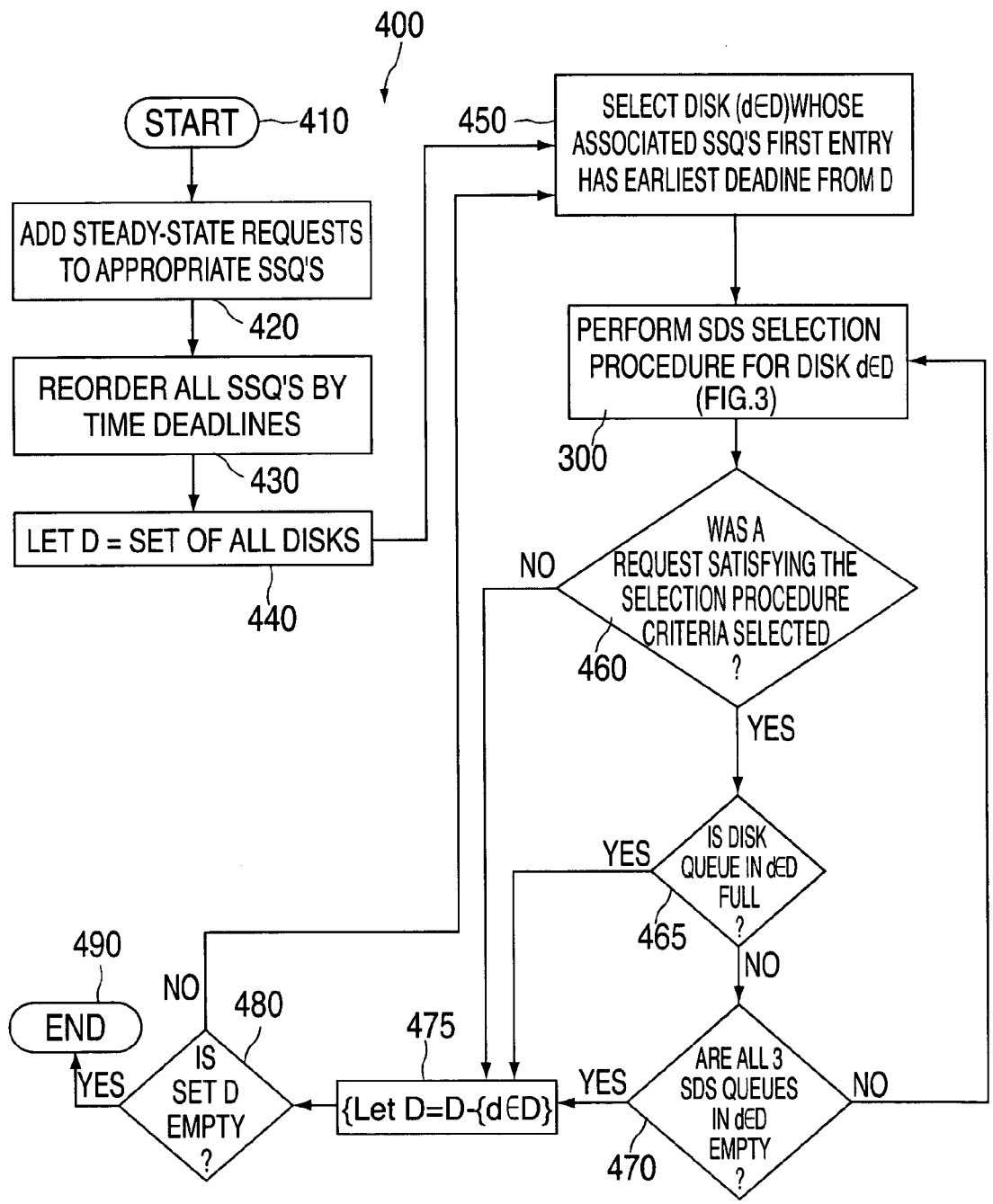
FIG. 4 depicts a flowchart specification of the Scheduling Interval Procedure.

FIG. 4 shows a formal specification of the Scheduling Interval Procedure 400 in flowchart form. First, the Scheduling Interval Procedure adds steady-state requests to the appropriate SSQs, if possible (step 420), and reorders all the SSQs by time deadlines (step 430). The Scheduling Interval Procedure 400 then groups all of the disks, where "D"=a set of all of the disks (step 440). The disk that has the earliest associated deadline for the first entry in its SSQ is then selected (step 450). The Selection Procedure is performed for the selected disk (step 300), and then the Scheduling Interval Procedure checks whether a request satisfying the Selection Procedure 300 criteria was selected (step 460). If not, the disk with the next earliest deadline for the first entry in its associated SSQ is selected (steps 475, 480, 450) and the Selection Procedure is repeated for this disk (step 300). Otherwise, the Scheduling Interval Procedure 400 checks whether the selected disk's queue is full (step 465), or if all three SDS queues for the selected disk are empty (step 470). If either of these conditions is true, then the disk with the next earliest deadline for the first entry in its SSQ is selected (steps 475, 480, 450) and the Selection Procedure is repeated for this disk (step 300). If, however, both conditions are false, the Selection Procedure 300 is repeated for the same selected disk. Thus, the disks are processed sequentially, ordered by the corresponding SSQ's first deadline, where "processing" means that the Selection Procedure is invoked repeatedly until the disk queue is full or there are no more requests for that disk.

As disclosed in FIG. 4, the Scheduling Interval Procedure fills each of the disk queues one at a time, which is most efficient for small disk queues. In the preferred embodiment, a small disk queue is used, as it facilitates the latency reduction. In particular, as soon as the servicing of a request extends past its worst-case access time, the request is aborted by the SDS, i.e., the SDS "times-out" waiting for the request to be serviced and then moves to the next procedural step. To assist in error handling when using a disk queue with a depth that is greater than one, such that the server may determine which request was not fulfilled within a predefined time period, the server maintains a disk mimic queue that mimics the content of the disk queue of each of the disk drives. As such, the server can poll the mimic queue to determine the nature of the errant request and send an "abort" command to the disk drive for that request. The disk drive will then process the next request in the disk queue and the server updates the mimic queue.

Figure 5:
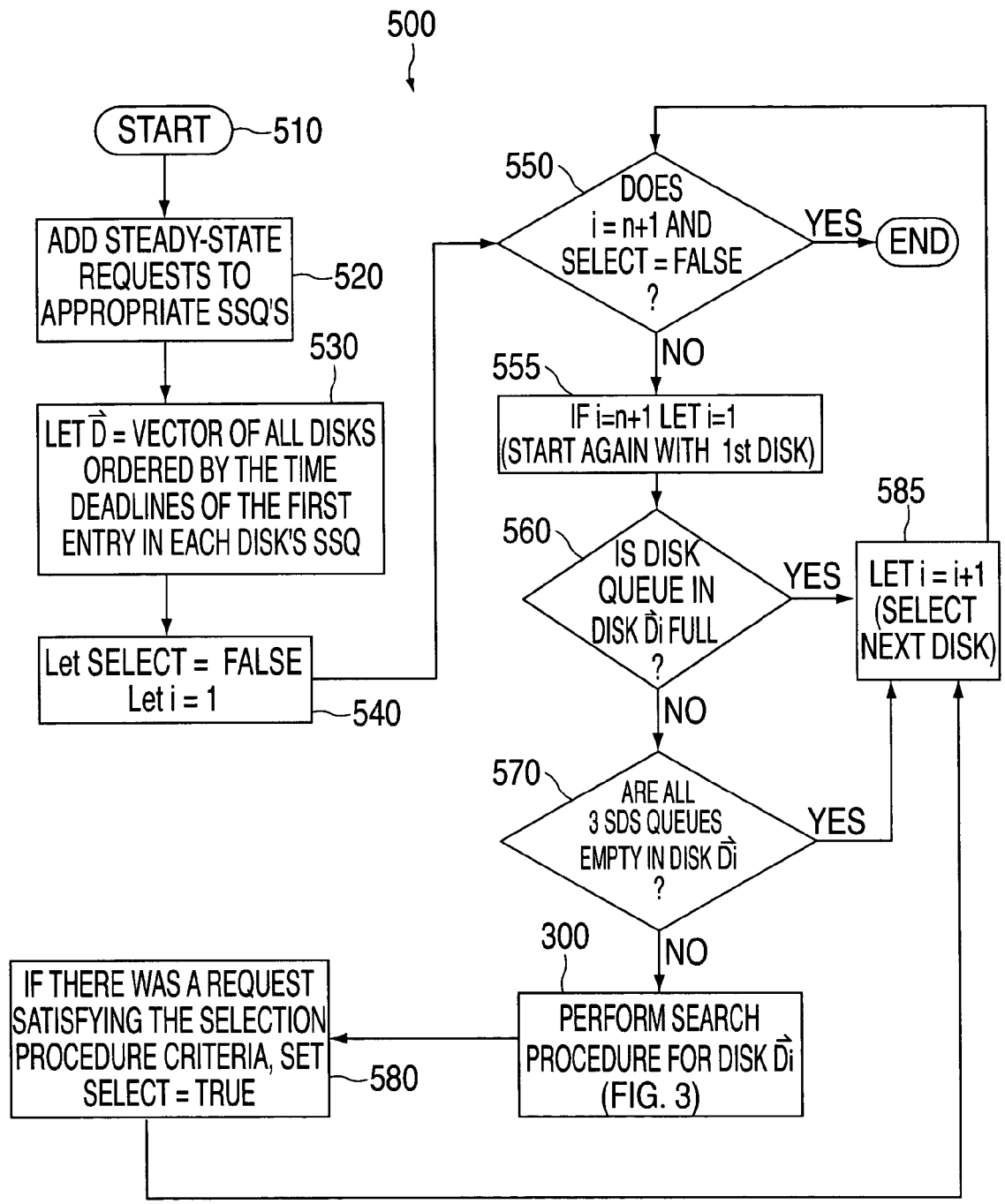
FIG. 5 depicts a round-robin version of the Scheduling Interval Procedure.

In the case of large disk queues, however, filling the disk queues in a round-robin fashion may be more efficient. A round-robin version of the Scheduling Interval Procedure for large disk queues is shown in FIG. 5. As in the previous embodiment of the Scheduling Interval Procedure, steady-state requests are first added to the appropriate SSQs (step 520), and disks are ordered by the deadlines of the first entry in each disk's SSQ. In this round-robin version, however, the Selection Procedure is executed only once for a disk, and then the next disk is selected. Once all disks have been selected, the round-robin Scheduling Interval Procedure goes through each of the disks once again in the same order, executing the Selection Procedure once per disk. This process is continued until no more requests can be added to any of the disk queues.

Specifically, a vector D is defined as an ordered list of all the disks, where the order is based on the time deadlines of the first entry in each disk's SSQ (step 530). A Boolean variable SELECT is initialized to false, and an integer variable i is initialized to 1 (step 540). The following condition is then tested: if i=n+1 and SELECT=false (step 550). As will be seen shortly, this condition will only be true when all of the disks have been selected and no requests could be added to any of the disk's queues. Next (step 555), if i=n+1 (i.e., the last disk had been selected in the previous iteration), then i is set to 1 (start again with the first disk). If disk $D_i$'s disk queue is full (step 560), or all three of $D_i$'s SDS queues are empty (step 570), then the next disk is selected (step 585). The Selection Procedure is performed for $D_i$ (step 300), and if a request satisfying the Selection Procedure criteria was found, SELECT is set to true (step 580), and the next disk is selected (step 585). Thus the SELECT variable indicates whether a request was added to one of the disk queues during a pass over the vector of disks.

Figure 6:
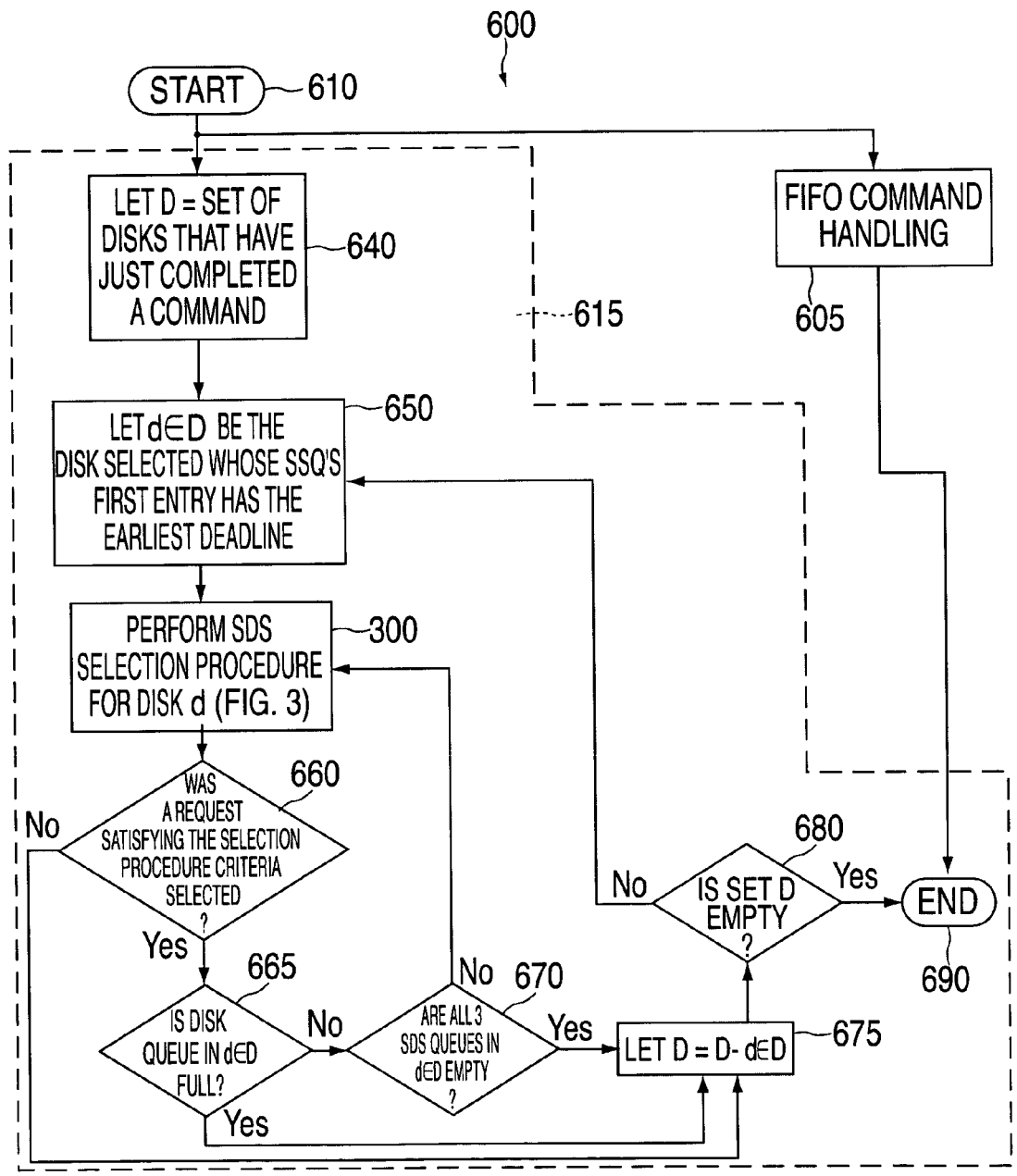
FIG. 6 depicts a flowchart specification of the Command Completion Procedure.

The Command Completion Procedure is executed, on a first-in, first-out basis, every time a disk completes a command. Thus, for each completed command, the Command Completion Procedure executes in the order in which the commands are completed, i.e., using the FIFO command handling step as shown in FIG. 6. As such, the Command Handling Procedure begins at step 610, proceeds to step 605, and ends at step 690.

Alternatively, the procedure can be adapted to handle simultaneous command events. In this procedure, it is first determined if multiple disks have completed a command simultaneously at the command completion event. (Most likely only one disk will have completed a command at the command completion event, but the multiple-disk situation is possible.) If more than one disk has completed a command, then the first entries in the SSQs of these disks are sorted based on time deadlines, thereby determining the order in which the disks are serviced. Once the disk order has been established, the SDS Selection Procedure is performed for each disk in order in the same manner as the Scheduling Interval Procedure (FIG. 3). That is, for each disk, the Selection Procedure is repeatedly executed as long as the associated disk queue is not full, at least one of the three SDS queues (SSQ, NSQ, ORQ) is not empty, and there is a request in one of the three SDS queues that satisfies the Selection Procedure criteria.

A formal specification of both forms of the Command Completion Procedure is shown in flowchart form in FIG. 6. Step 605 represents the standard FIFO command handling procedure, while the dashed box 615 represents an alternative procedure capable of handling simultaneous command occurrences. In this alternative version, the Command Completion Procedure 600 determines which disks have just completed a command (step 640), and the disk that has the earliest deadline for the first entry in its SSQ is then selected (step 650). Just as in the Scheduling Interval Procedure, the Selection Procedure is performed for the selected disk (step 300), and then the Command Completion Procedure 600 checks whether a request satisfying the Selection Procedure criteria was selected (step 660). If not, the disk with the next earliest deadline for the first entry in its SSQ is selected (steps 675, 680, 650) and the Selection Procedure is repeated for this disk (step 300). Otherwise, the Command Completion Procedure 600 checks whether the selected disk's queue is full (step 665), or if all three SDS queues for the selected disk are empty (step 670). If either of these conditions are true, then the disk with the next earliest deadline for the first entry in its SSQ is selected (steps 675, 680, 650) and the Selection Procedure is repeated for this disk (step 300). If, however, both conditions are false, the Selection Procedure is repeated for the same selected disk.

As disclosed in FIG. 6, the Command Completion Procedure fills each of the disk queues one at a time, i.e., the disk with a complete event is refilled. Note that since it is highly unlikely that more than one disk is serviced on a command completion event, the choice of whether to employ round-robin or sequential filling of the disk queues in the Command Completion Procedure has essentially no impact on performance.

In both the Scheduling Interval and Command Completion Procedures, the ordering of requests within the disk queues are managed by the video server central processing unit (CPU), and not the disks themselves. (Any reordering operations normally performed by the disk must be disabled.) While reordering by the disks would improve the average seek time, managing the disk queues by the CPU is required to preserve the time deadlines of the user requests.

Figure 7:
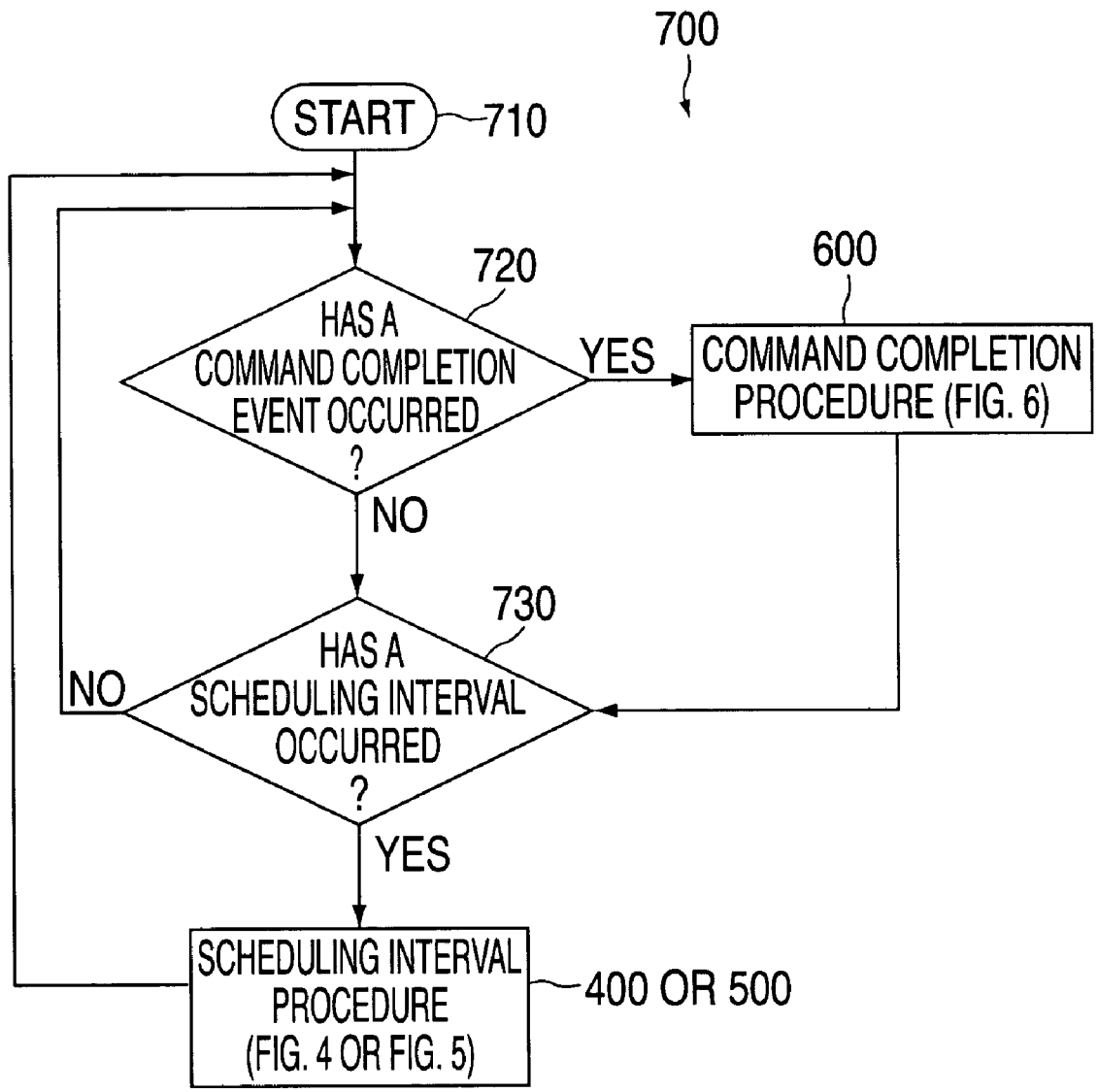
FIG. 7 depicts a flowchart of a method for prioritizing the Scheduling Interval Procedure (FIG. 4 or 5) and the Command Completion Procedure (FIG. 6) of the present invention.

FIG. 7 depicts a flowchart of a method 700 for prioritizing the Scheduling Interval Procedure (FIG. 4 or 5) and the Command Completion Procedure (FIG. 6) of the present invention. The method 700 starts at step 710 and proceeds to step 720. In step 720, it is determined whether a command completion event has occurred. Whenever a command completion event occurs, the Command Completion Procedure 600 is invoked. Furthermore, in step 730, it is determined whether a scheduling interval has occurred. If, in step 730, a scheduling interval occurs, the Scheduling Interval Procedure is invoked (step 400 or 500). As shown in the figure, if both a scheduling interval and a command completion event occur simultaneously, the command completion is given priority and the Command Completion Procedure 600 is executed first. Alternatively, as discussed above, when a disk queue having a depth that is greater than one is used, the execution priority for these procedures is reversed.

Figure 8:
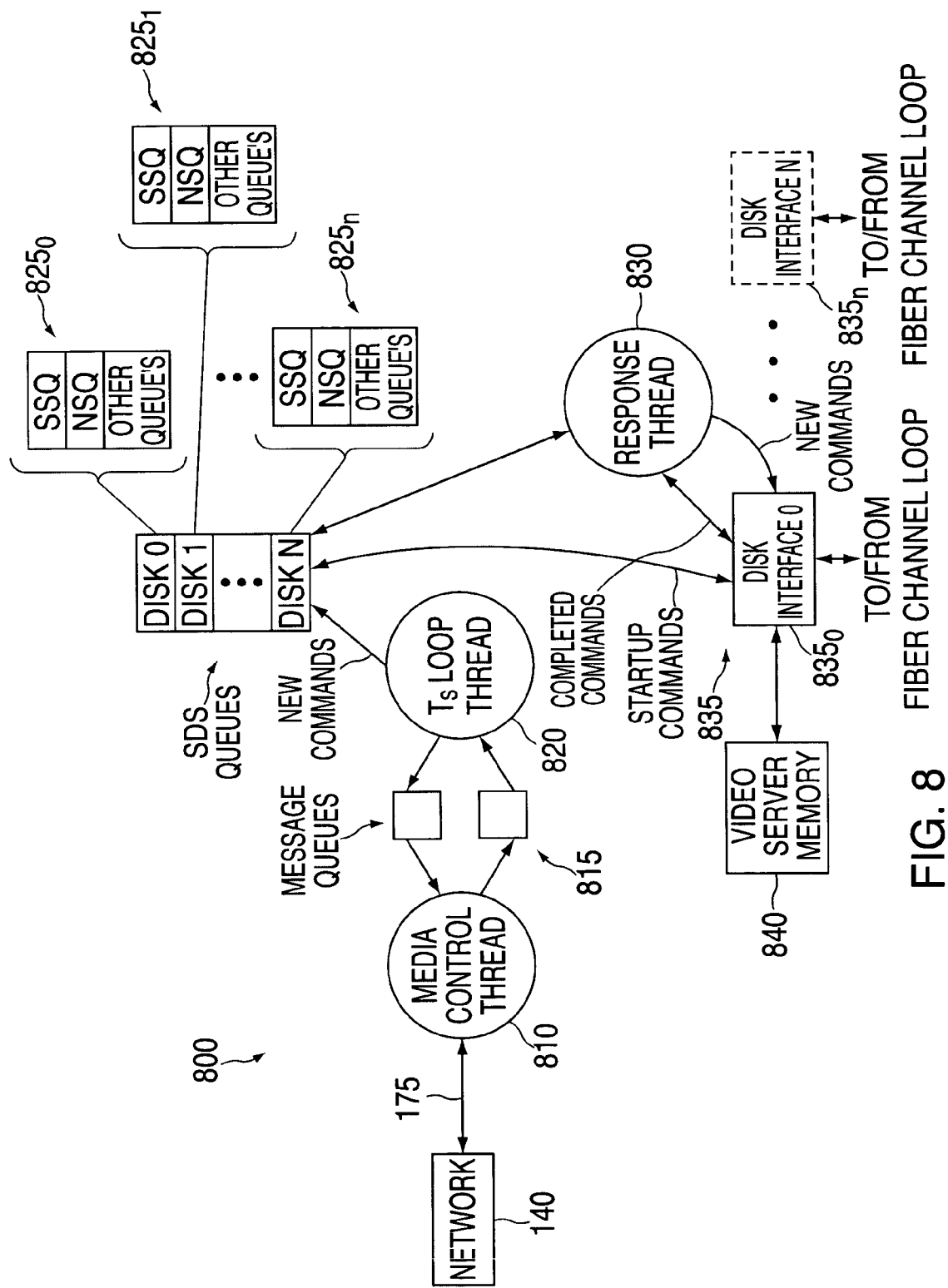
FIG. 8 shows the software process architecture for a preferred multi-threaded implementation of the method of the present invention.

In one embodiment, the method of the present invention is implemented as a multi-threaded process. FIG. 8 shows the software process architecture 800 for this embodiment of the invention. The media control thread 810 receives new-subscriber request messages from the transport network 140 and path 175, and forwards these requests through message queues 815 to the $T_s$ loop thread 820. The $T_s$ loop thread 820 is a top level scheduler responsible for two primary functions: first, it maintains all state information necessary to communicate with the disk interfaces 835 (e.g., $835_0$ to $835_n$) and video server memory 840; second, it performs the Scheduling Interval Procedure (400 or 500) using a period of, for example, 100 ms. The $T_s$ Loop thread 820 allocates the commands to the SDS queues 825, where each disk drive is associated with a set of queues (e.g., SSQ, NSQ and other queues) generally shown as queues $825_0$, $825_1$, . . . $825_N$. At the startup condition, when the disks are idle, the initial commands (startup commands) from the $T_s$ loop thread 820 are sent from the SDS queues 825 directly to the disk interfaces 835. Under steady-state operation, a response thread 830 communicates the commands from the SDS queues 825 to the disk drive interfaces 835. Each interface 835 communicates to individual disk drives through a fiber channel loop. Response thread 830 also receives command completion messages from the disk interfaces 835. Upon receiving these messages the response thread 830 performs the Command Completion Procedure (step 600). Media control thread 810, $T_s$ loop thread 820, and response thread 830 are all executed by video server CPU 114 of FIG. 1.

Figure 9:
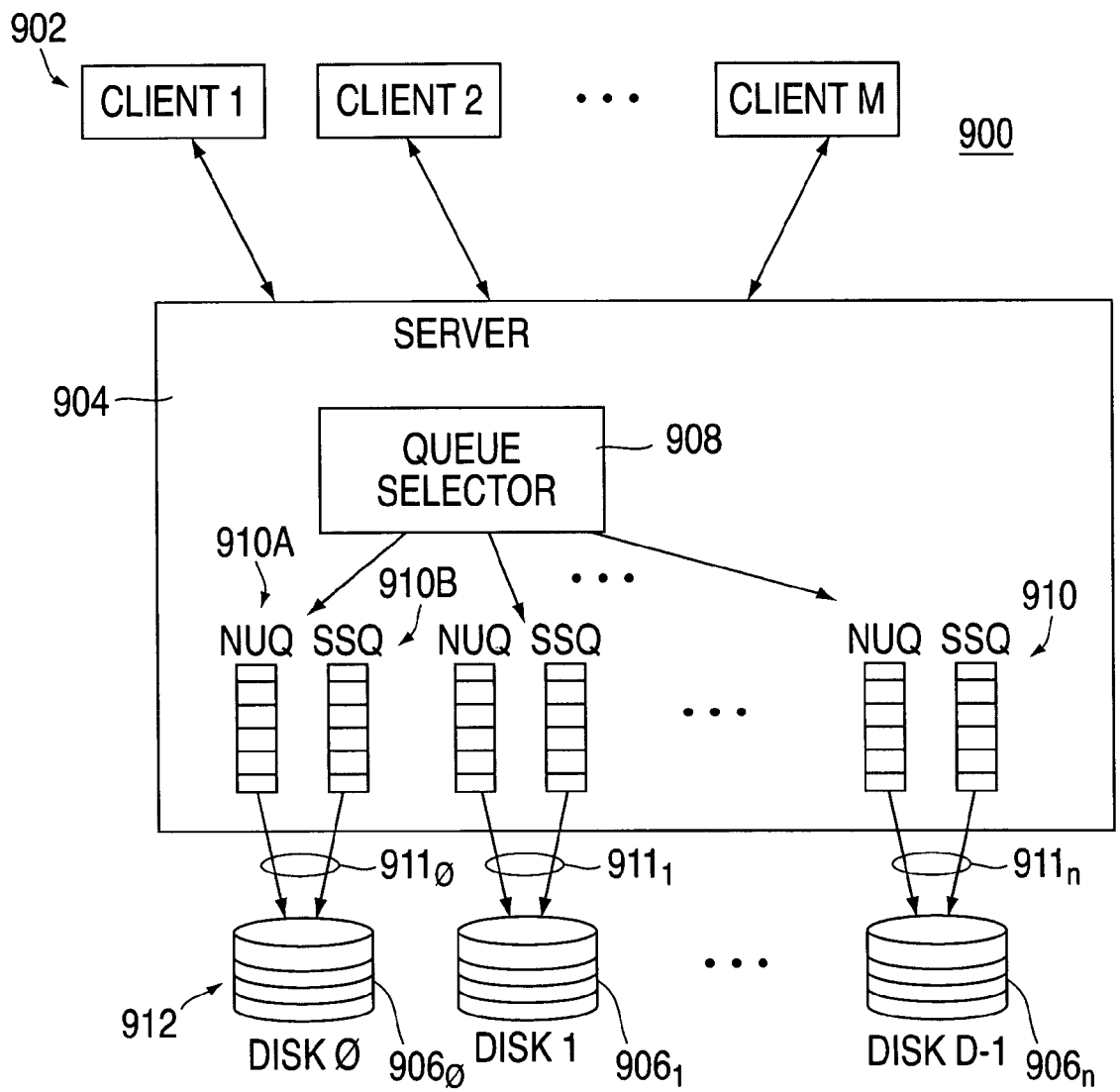
FIG. 9 depicts a block diagram of an alternative embodiment of the present invention.

FIG. 9 depicts a block diagram of another embodiment of the present invention comprising a video server system 900. The system 900 comprises a plurality of clients 902 (also referred to as subscribers or users), a server 904, and a plurality of disk drives 906. The server 904 comprises a queue selector 908 and a plurality of queues 910. The queues 910 comprise at least one new user queue (NUQ) 910 A and a steady-state queue (SSQ) 910 B that are coupled to each disk drive 906. The queue selector 908 operates using a disk scheduling algorithm that is executed by the server 904 that can determine priority (new user vs. steady state) through analysis of the actual distribution of steady state user disk requests, giving the new user request priority when doing so would not jeopardize the requirement that the steady state requests miss no access deadlines, but otherwise giving the steady state requests priority. For each new user request, the queue selector 908 operates only once, at the time the new user requests occur (not every time each disk completes a read). In this case, the NUQ 910A is always given priority over SSQ 910B when disk reads are issued via path 911. In the following description of this alternative embodiment of the invention, the scheduling algorithm shall be referred to as facilitating a "controlled admission policy" for controlling disk drive access.

One basis for the controlled admission policy is the existence of at least two separate queues 910A and 910B for each disk $906_n$ in a server's disk loop 912. This is shown schematically in FIG. 9, which depicts a server with M clients 902 and D (D=n+1) disks 906. Each disk 906 has its own new user queue 910A and steady state queue 910B. When a user (client) "enters" the server by requesting access to a disk drive (i.e., the user requests delivery of a video program), the user's first disk request is performed from the NUQ; all subsequent requests from that user are serviced from the SSQ's (until, that is, the user requests a new file or new file position, in which case the first request for the new file or new file position is serviced from a NUQ).

Recall that the steady state disk scheduling consists of a user sequentially accessing each disk in the disk loop by enqueuing a data request, i.e., the user request is enqueued for an extent read on disk J at time T, and on disk J+1 at time T+SP and on disk J+2 at time T+2*SP, and so on where SP is the service period within which all steady state users must be serviced. The fact that that user must read from disk J between times T and T+SP means that the user's request for data from disk J is enqueued into disk J's SSQ at time T, and that within the next service period the disk loop must service that request. Although the request is entered into the SSQ at time T, if many clients are using the server, it is likely that the request is not actually serviced for some time, during which the request sits pending in the queue while the request waits for its time to actually read from disk. The existence of the NUQ's (distinct from the SSQ's) allows the server to give steady state user requests priority over pending new user requests.

In order to perform a controlled admission policy, the server must be able to ascertain whether allowing a new user disk read to proceed ahead of any already enqueued steady state requests (on the same disk) will potentially cause missed deadline problems with the already existing steady state users of the server. In order to be able to make such a determination, the server must know each user's disk deadlines and the extent size of the requested data. (The extent size determines the expected time that the disk read will take.) If there are D disks in the disk loop, each user enqueues a read from each disk periodically once every D service periods. The full set of a user's disk deadlines can thus be summarized with just one number, e.g., the user's first deadline on disk 0, since all the other deadlines are simply periodic extensions from that one. Rather than use actual numeric deadlines, the following discussion uses "enqueue times", which are one SP before each deadline. Each user's steady state scheduling requirements can thus be fully summarized with two numbers: (1) the extent size E of the data requested by the user, and (2) a normalized time value T0 (such that $0 \leq T0 < D*SP$), that tells when the user will enqueue a read from disk 0.

Figure 10:
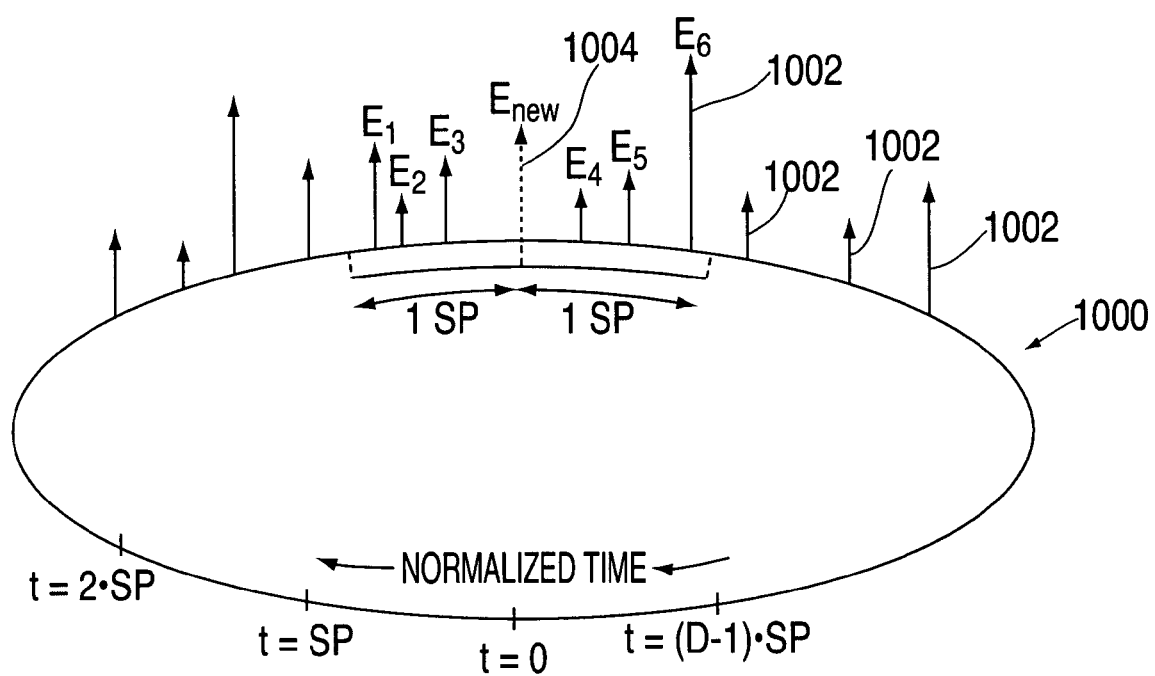
FIG. 10 depicts a timing diagram for enabling access to the system of FIG. 9.

FIG. 10 schematically shows these two numbers for a full set of all users requesting information from the server. The loop 1000 shown is a time axis, running from time 0 to time D*SP, with the time value D*SP being equivalent to time 0 (and thus the time axis wrapping around to form a circular loop). Each client using the server is represented by a single vertical vector 1002 sitting on the time axis disk loop 1000. The height of each user's vector 1002 is proportional to that user's extent size (and thus to that user's bitrate), and the position that the vector 1002 sits on the loop 1000 is the normalized time T0 at which that user will periodically enqueue a read from disk 0.

The dashed vector 1004 represents a disk usage request from a new client attempting to enter the server. That user's extent size is E_new and that user's normalized disk 0 request time is T0(new). T0(new) is calculated as follows: suppose the time the server receives the new user request is T_req and suppose the request is for a read from disk 1. Then, if the server were to allow that request to proceed (preempting any already enqueued, but not started, steady state reads) then that user would be requesting a read from disk 0 (D−1) service periods later (since there are D disks in the loop), at time $$T0(\text{new})\_\text{unnormalized}=T\_req+(D-1)*SP.$$

Assuming all times are measured with respect to some time 0 that occurred before any client entered the server, T0(new) is then simply the remainder of T0(new)_unnormalized after dividing by D service periods:

$$T0(\text{new})=T0(\text{new})\_\text{unnormalized} \% (D*SP).$$

Note that the service period prior to T0(new) has three steady state users requesting disk 0 reads in it: users 1, 2 and 3 with extent sizes E1, E2 and E3. Similarly, the service period following when the new user would read from disk 0 has three users 4, 5 and 6 requesting disk 0 reads.

Suppose user 3's request would come 5 milliseconds (msec) before the new user's request, and user 4's would come 5 msec after the new user's request, so that $$T0(\text{new})-T0(3)=T0(4)-T0(\text{new})=5 \text{ msec}.$$

Further suppose at the time the server receives the new user's request (T_req), user 3's request is still pending on disk 1's SSQ (the request was enqueued on disk 1's SSQ 5 msec earlier). The goal of the server's controlled admission algorithm is to ascertain whether preempting user 3's pending request on disk 1 with the new user's request, and delaying user 4's, will cause any missed deadlines by any existing server clients (user 3 or 4, or any others).

The amount of time it takes to read a fixed amount of data from a hard disk is not completely deterministic. In fact, the data access time depends on the distance the hard disk arm needs to seek, on whether multiple "on-track" attempts need to be made to successfully read serve data, and on the rotational latency experienced once the read head is determined to be on-track. These factors cause the statistical distribution of access times required to read a certain extent size to range over 100 msec.

Figure 11:
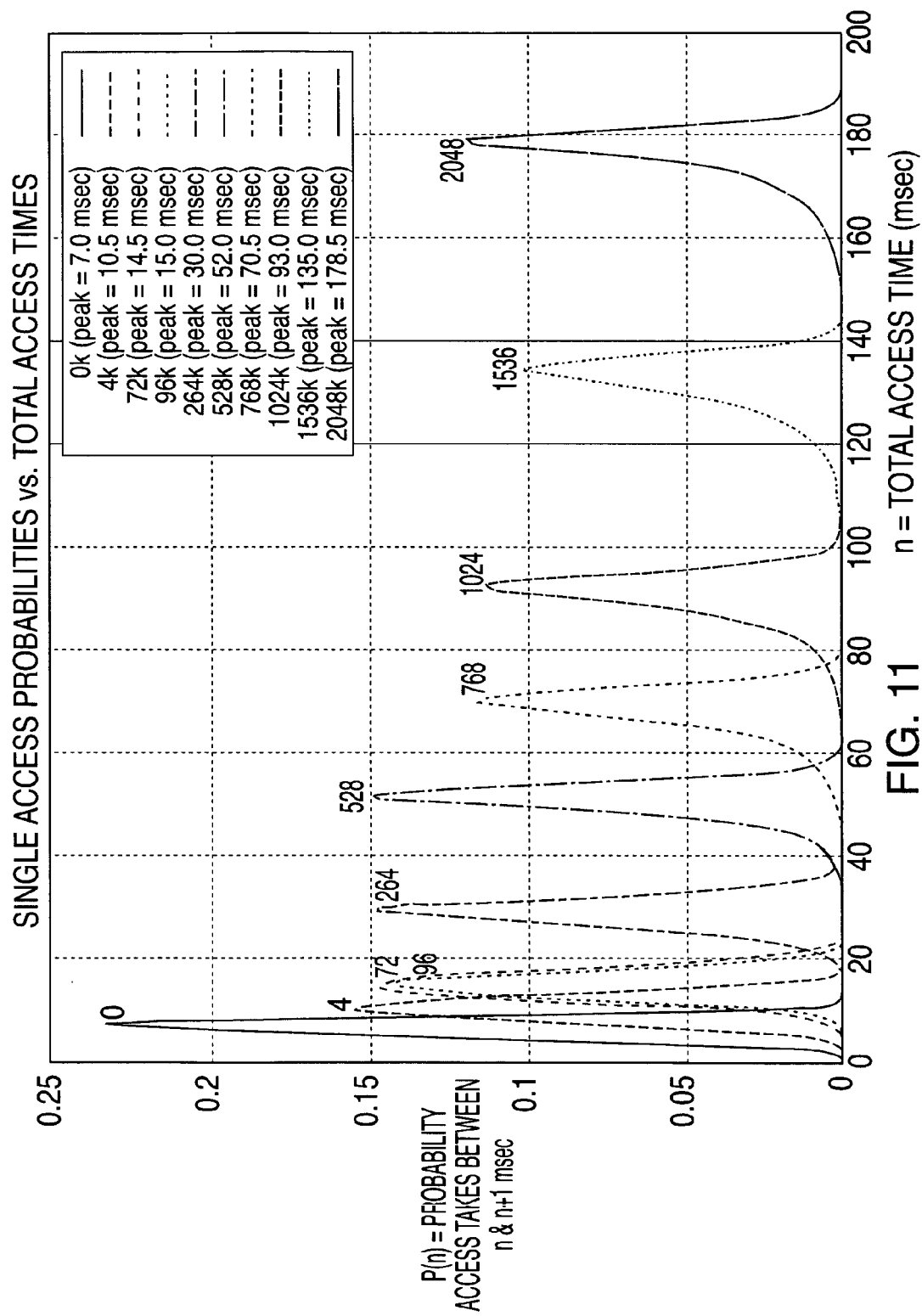
FIG. 11 depicts a probability distribution diagram for access time versus various extent sizes.
Figure 12:
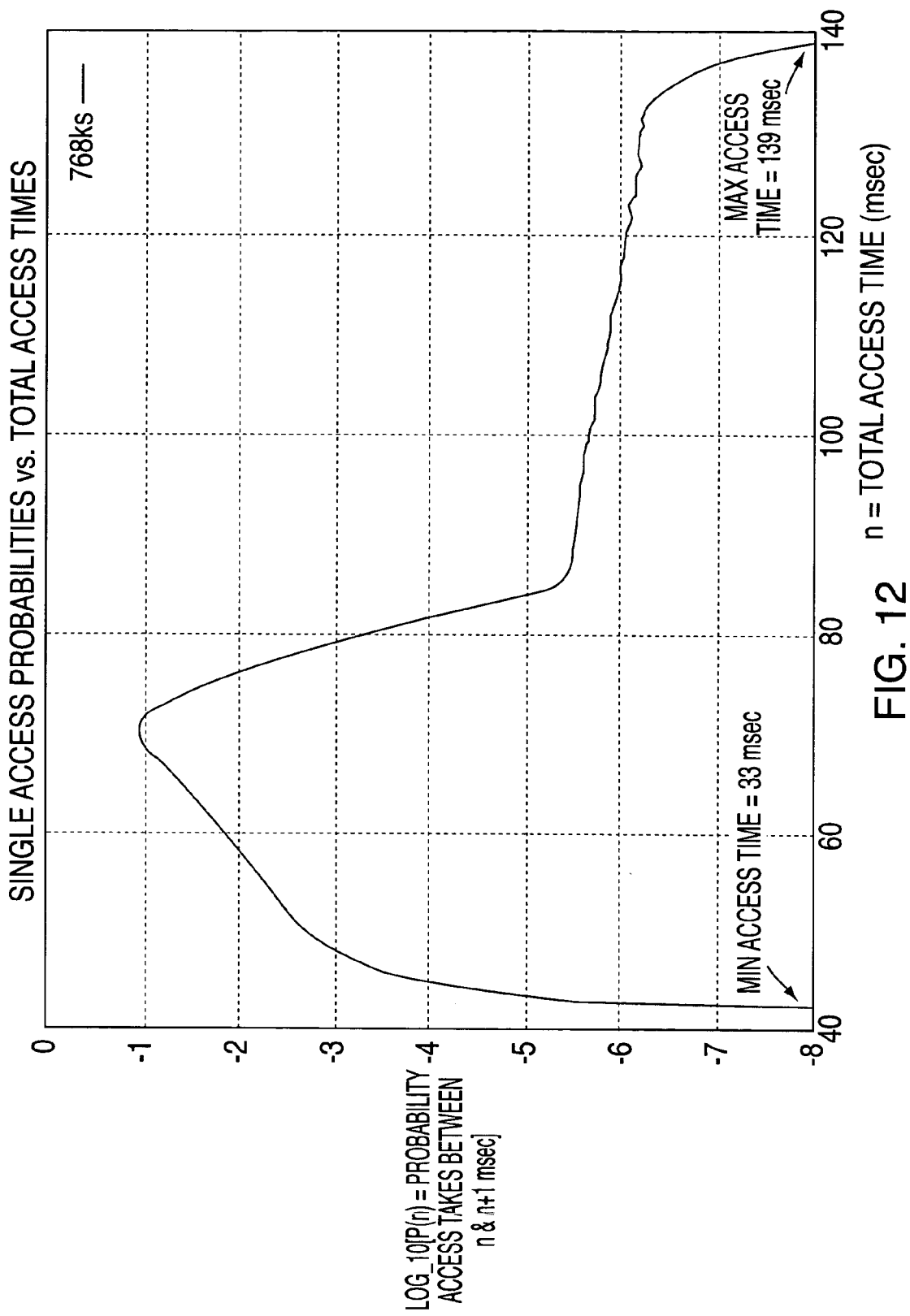
FIG. 12 depicts an expanded view of the 768 k extent size graph of FIG. 12.

FIG. 11 shows such access time distributions for nine different extent sizes E ranging from 4 kilobytes (kB) to 2 megabytes (MB). Of course, as the amount of data read increases, the average access time increases too. But even for a given extent size, the distribution of access times has most of its probability density over a range of 30 msec. In fact, FIG. 12 shows a detailed view of one of the curves (E=768 kB) in FIG. 11, now plotted logarithmically, so that the small probability tail can be seen. It is seen that, on the disks this data was extracted from, the reads of 768 kB extents ranged from taking 33 msec to taking 139 msec. Most of the probability density ranges from 50–80 msec, but there is some small chance that very long access times (over 100 msec) will occur.

The controlled admission algorithm must thus allow for the stochastic nature of the disk access process. To provide further understanding of this issue, a probabilistic analysis is performed below for the following problem: given a sequence of Q disk requests for extent sizes E1, E2, . . . , EQ, how long must the system wait before it is known that the probability that all Q accesses have completed is greater than 1-z, for some small number z. The total time the system must wait is called T_Q(E1, E2, . . . , EQ). For $z=10^{-6}$, the probability that all Q reads are not finished after waiting T_Q is smaller than one in a million.

The analysis is performed for a single fixed extent size E. Let p(n,E)=probability that a disk read of extent size E takes between n and n+1 msec. p(n,E) is shown in FIG. 11 as a function of n, for 9 different extent sizes E.

J_Q(n,E)=probability Q successive accesses of extent size E takes longer than n msec total.

The following shows a method of calculating J_Q(n,E) given the p(n,E) as input.

$P_i$=probability a single access takes between $i$ and $i+1$ msec.

$P_i=0$ for $i \geq N => N$ msec=max access time.

$$\sum_{i=0}^{N-1} P_i = 1.$$

$I_1(n)$ = probability of one access taking $\leq n$ msec.

$$= \sum_{i=0}^{n-1} P_i, (n \geq 1).$$

$I_1(N) = 1. \quad I_1(0) = 0.$ $I_2(n)$ = probability of two successive accesses taking $\leq n$ msec.

$$= \sum_{i=0}^{n-1} P_i I_1(n-i-1)$$

$$I_Q(n) = \sum_{i=0}^{n-1} P_i I_{Q-1}(n-i-1), \text{ (for } Q \geq 2)$$

= probability of Q successive accessses taking $\leq n$ msec.

Define $J_Q(n)=1-I_Q(n)$=probability of Q accesses taking >n msec.

Then the above equations become $$\begin{cases} J_1(n) = \theta(N-1-n) \sum_{i=n}^{N-1} P_i \\ J_Q(n) = J_1(n) + \sum_{i=0}^{n-1} P_i J_{Q-1}(n-i-1) \quad [Q \geq 2, n \geq 1] \\ J_Q(0) = J_1(0) = 1. \end{cases}$$

Here $\theta(n \geq 0)=1$ and $\theta(n<0)=0$.

The minimum time to wait for all Q accesses to finish with probability greater than 1-z is T_Q(E,E, . . . , E). T_Q(E, E, . . . E can then be directly obtained from J_Q(n,E) as the minimum "n" such that J_Q(n,E) <z.

The foregoing analysis can be extended to multiple constant bit rate (mCBR), i.e., to different extent sizes. The first problem to be dealt with is that the extent size can vary continually. In the single extent size (CBR) case, the system only needs the p(n,E) distribution of the one extent size E as input. But in the mCBR case, E can vary, so the system needs to be able to estimate (or interpolate) p(n,E) for any E. As discussed below, this is performed by noting that the system can pick a baseline E (called E_0 there), and estimate the other p(n,E) as rigid shifts of p(n,E_0). With that approximation, the following shows how to calculate T_Q(E1, . . . EQ) given the p(n,E_0) and the shift parameters as input.

From FIG. 11 it is seen that the p(n,E) curves are roughly shifted versions of the same curve. So assume the system is given a set of $p^{SH}$ (nE) curves that are shifted versions of a baseline $p^{sh}$ (nE°) curve:

$$p^{sh}(n,E) = p^{sh}(n-\Delta(E), E°)$$

A preliminary result needed is that $J_Q(E_1 \ldots E_Q)$ is independent of the order of the $E_1 \ldots E_Q$:

$$I_1(n, E) = \sum_{i=0}^{n-1} p(i, E) \ (n \geq 1)$$

$I_2(n, E_1 E_2)$ = probability that read $E_1$ then read $E_2$ takes $\leq n$ msec $$= \sum_{i=0}^{n-1} p(iE_1) I_1(n-i-1, E_2)$$

$$= \sum_{i=0}^{n-2} [p(iE_1) I_1(n-i-1, E_2] \quad \text{since } I_1(n=0, E) = 0.$$

$$= \sum_{i=0}^{n-2} \sum_{j=0}^{n-i-2} p(iE_1) p(jE_2)$$

$$= \sum_{i=0}^{n-2} \sum_{j=0}^{n-2} p(iE_1) p(jE_2) \theta(n-2-i-j)$$

$= I_2(nE_2 E_1)$, since the foregoing is symmetric in $i \to j$

The general result then follows recursively from this.

Now suppose $p(jE_2)=p(j-\Delta, E_1)$. Then $$I_2(nE_1 E_2) = \sum_{i=0}^{n-2} \sum_{j=0}^{n-2} p(iE_1) p(j-\Delta, E_1) \theta(n-2-i-j)$$

$$= \sum_{i=0}^{n-2} \sum_{k=-\Delta}^{n-2-\Delta} p(iE_1) p(kE_1) \theta(n-2-\Delta-i-k) \begin{cases} k = j-\Delta \\ k+\Delta = j \end{cases}$$

$$= \sum_{i=0}^{n-2} \sum_{k=0}^{n-2-\Delta} p(iE_1) p(kE_1) \theta(n-2-\Delta-i-k) \begin{cases} \text{since} \\ p(n<0) = 0 \end{cases}$$

$$= \sum_{i=0}^{n-2-\Delta} \sum_{k=0}^{n-2-\Delta} p(iE_1) p(kE_1) \theta(n-2-\Delta-i-k) \begin{cases} \text{since} \\ \theta() \Rightarrow \\ i < n - \\ 2 - \Delta - k \end{cases}$$

$= I_2(n-\Delta, E_1 E_1).$

Now suppose $p(jE_2) = p(j-\Delta_2, E_1)$ and $p(jE_3) = p(j-\Delta_3, E_1)$:

-continued $$I_3(nE_1E_2E_3) = \sum_{i=0}^{n-1} p(iE_3)I_2(n-i-1, E_1E_2)$$

$$= \sum_{i=0}^{n-1} p(iE_3)I_2(n-i-1-\Delta_2, E_1E_1)$$

$$= \sum_{i=0}^{n-1} p(i-\Delta_3, E_1)I_2(n-i-1-\Delta_2, E_1E_1)$$

$$= \sum_{j=-\Delta_3}^{n-1-\Delta_3} p(jE_1)I_2(n-j-1-\Delta_2-\Delta_3, E_1E_1) \quad \begin{cases} j = i - \Delta_3 \\ j + \Delta_3 = i \end{cases}$$

$$= \sum_{j=0}^{n-1-\Delta_3} p(jE_1)I_2(n-j-1-\Delta_2-\Delta_3, E_1E_1) \quad \{p(n<0) = 0$$

$$= \sum_{j=0}^{n-1-\Delta_2-\Delta_3} p(jE_1)I_2(n-j-1-\Delta_2-\Delta_3, E_1E_1)$$

↓

[Since $I_2(n \le 0) = 0 \Rightarrow j < n - 1 - \Delta_2 - \Delta_3$ above.

$= I_3(n - \Delta_2 - \Delta_3, E_1E_1)$.

Since $J_Q(n) = 1 - I_Q(n)$, the above arguments recursively give the following result:

If the $p^{sh}(nE)$ are probability densities satisfying $p^{sh}(n,E) = 0$ for $n<0$, and $p^{sh}(n,E_i) = p(n - \Delta_i, E^\circ)$, then $J_Q^{sh}(n;E_1 \ldots E_Q) = J_Q^{sh}(n - \Delta_1 - \Delta_2 \ldots \Delta_Q; E^\circ E^\circ \ldots E^\circ)$.

That implies $T_Q^{sh}(E_1 \ldots E_Q) = T_Q^{sh}(E^\circ \ldots E^\circ) + \Delta_1 + \Delta_2 + \ldots + \Delta_Q$ For example, $T_{Q=19}^{sh}[10(768 \text{ KB}) + 5(4 \text{ KB}) + 4(2 \text{ MB})]$ $= T_{Q=19}^{sh}[19(768 \text{ KB})] + 5\Delta(4 \text{ KB}) + 4\Delta(2 \text{ MB})$ $= 19(75 \text{ msec}) + 5(-56) + 4(108) \text{ msec}$ $= 1633 \text{ msec}$.

Figure 13A:
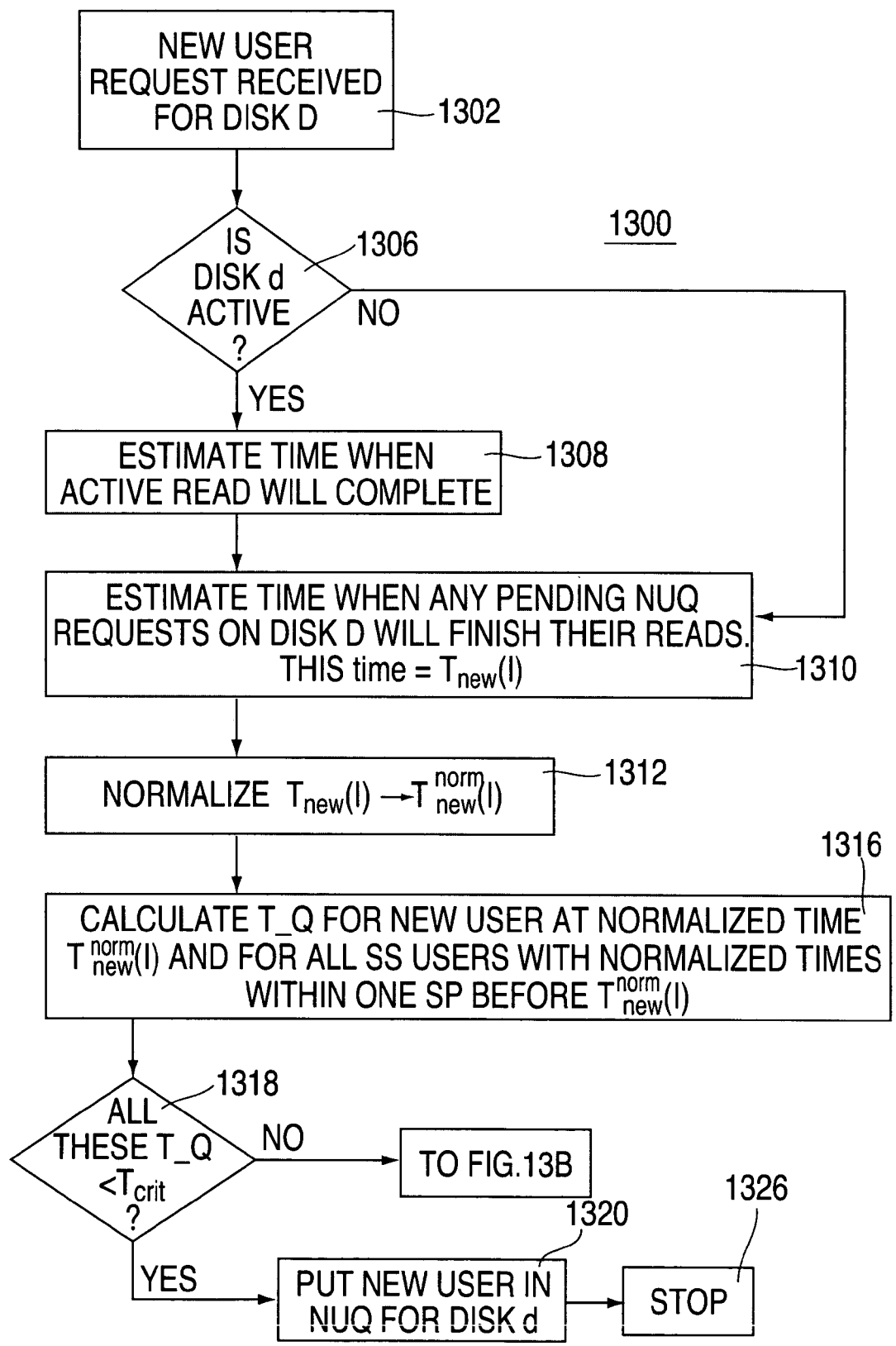
FIGS. 13A and 13B together depicts a flow diagram representing the operation of the alternative embodiment of the present invention of FIG. 9.

This mathematical analysis is combined with simulations to create a critical time T_crit to be used in the controlled admission algorithm, in the following manner. Referring to the flow diagram of the admission algorithm or method 1300 shown in FIGS. 13A and 13B, when a new user request comes in for disk d at time T_req (step 1302), the server at step 1306 first studies the current state of the requested disk's active queue.

If a read is active, the estimated time the read will complete is first calculated at step 1308 (using the probability curves shown in FIG. 11). To that expected time that the disk will be free, is added the expected access times for any NUQ requests already in the NUQ for that disk (that are allowed to start by the current calculated time) (step 1310). At this point, the method has the expected time that the disk will be free of higher priority (active and previous new user) requests. Call this time T_new__1. At step 1312 the time T_new__1 is normalized to the disk 0, (0, D*SP) range as explained above, to obtain the normalized time T_new__1_norm. The system must determine whether insertion of this disk read cause any existing users in the system to miss one of their disk read deadlines To answer that question, the system calculates at step 1316 the T_Q value for the new user as follows. The new user itself, and each user with normalized disk 0 access time within one SP greater (i.e., users 4, 5 and 6 in FIG. 10) are counted to form that user's set of Q accesses. The T_Q time is also calculated for each of the users with normalized disk 0 access time within one SP less than the new user (i.e., users 1, 2 and 3 in FIG. 10). Note that the value of Q may vary for each of these users: the new user may have Q=4 in FIG. 10 (including itself, and users 4, 5 and 6), but user 1 may have Q=5 (including itself, the new user and users 2, 3 and 4). Similarly, the T_Q(E1, E2, . . . , EQ) calculation depends on the (potentially different) extent sizes of each of the Q users, so each user calculates a different TQ value. It can be assured that preempting any steady state reads (by allowing the new user request to proceed at time T_new__1) will not cause missed deadlines (at least, not with probability greater than 1 in several million), if, at step 1318, the T_Q values calculated for each of these users is less than T_crit. If the query at step 1318 is affirmatively answered, the method proceeds to step 1320 where the new user is put in the NUQ for disk d. At step 1326, the method 1300 stops.

Figure 13B:
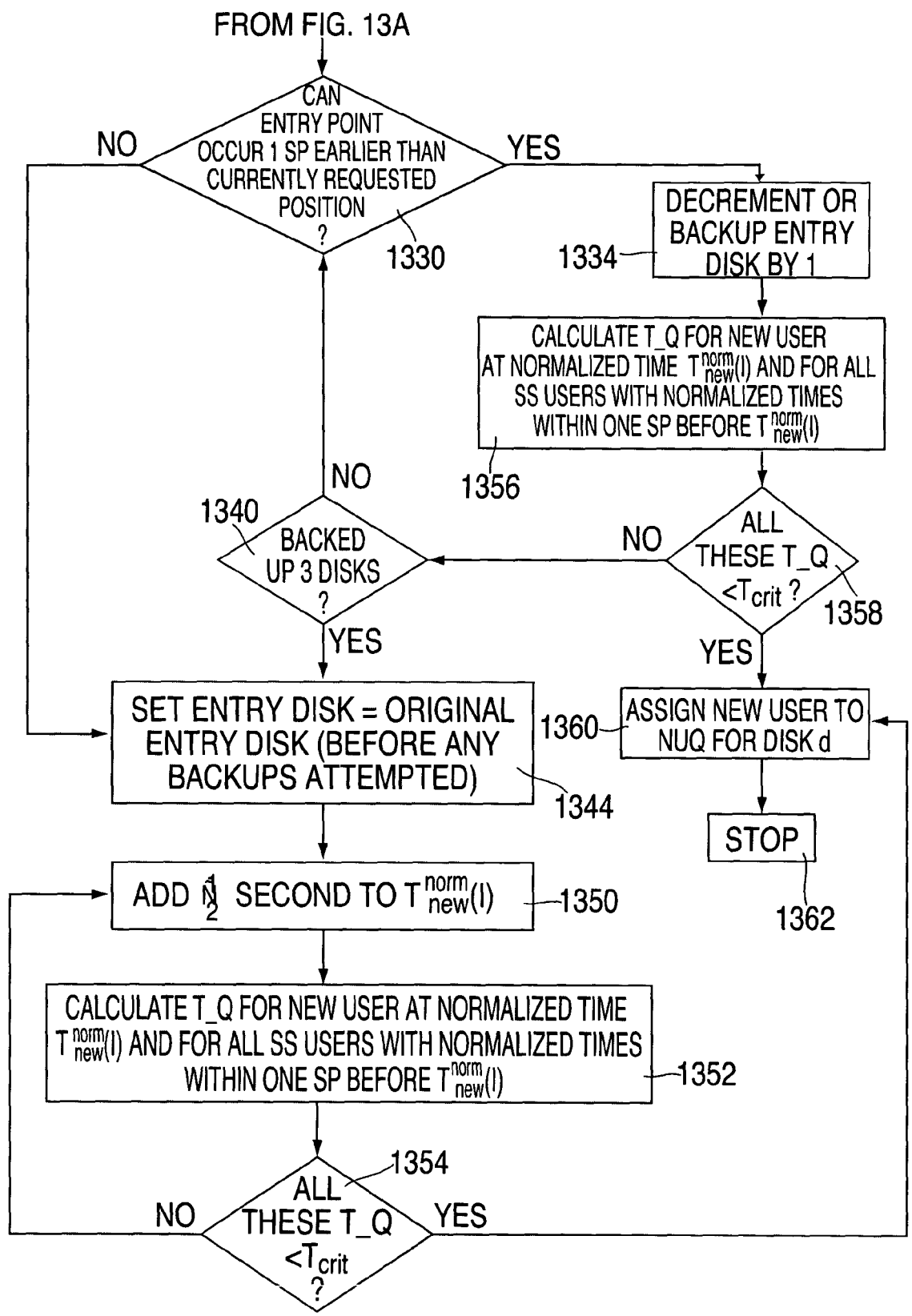

If, at step 1318, one of the T_Q<T_crit comparisons fails, then the new user is not allowed admission at that user's optimally requested time (i.e., at T_new__1), for fear that such an admission will generate a missed deadline on an already existing client. The admission algorithm 1300 deals with this case with a multi-tiered method, as shown in FIG. 13B. If optimal entry is denied, the server at step 1330 determines whether the requested entry point into the new user's data can be re-positioned to lie one service period earlier. If the new user is starting a new track at the beginning, or is requesting data that needs to be delivered at exactly the requested entry point, this entry point shift will be denied, and the algorithm proceeds to step 1344. If the entry point can be backed up, the entry disk is decremented by one in step 1334, and, at steps 1356 and 1358, the entry analysis performed in steps 1316 and 1318 of FIG. 3A is repeated. If entry is denied at step 1358 (at least one T-Q comparison failed), then step 1340 determines whether a maximum shift in the requested entry point has occurred (e.g., a maximum of 3 disks, equivalent to 3 service periods). If that maximum has not occurred, query 1330 is repeated to see if another backup can occur. (The previous backup may have moved the entry point to the start of the movie track, disabling any further backups.) If that backup is allowed, the procedure is repeated. If not, or if the maximum entry point backup has occurred, the algorithm proceeds to a mode where the entry time is delayed (as compared to the immediate entry at a shifted entry position attempted above). In step 1344, the entry disk is reset to its original value (before any backups are attempted) and, in step 1350, an additional delay is added to the user's entry time. Steps 1352 and 1354 are then performed to test for a legal entry in the manner described with respect to steps 1316 and 1318 of FIG. 3A. The process is continued until a legal entry position is found for the disk request. The process then proceeds to step 1360 where the new user is assigned to a NUQ for disk d. The process then stops at step 1362. Besides being the basis for the server's user admissions policy, the method or algorithm 1300 also allows for a method to determine the maximum load of the server. In particular, simulations can be performed, using this algorithm and real disk access time probability distribution curves, to determine at what client load level the distribution of latencies statistically experienced by all the users becomes unacceptable.

While this invention has been particularly shown and described with references to a preferred embodiment thereof, it will be understood by those skilled in the art that various changes in form and details may be made therein without departing from the spirit and scope of the invention as defined by the appended claims.

What is claimed is:

1. A method, comprising:
receiving a new user access request;
assigning the new user access request to a disk d of said disk array; and
determining when the new user access request will be processed by examining extent size for requested data stored on disk d, wherein if the new user access request will be processed within a predefined period of time, placing the new user access request into a new user queue for disk d; otherwise, assigning the new user access request to another disk of said disk array;
wherein priority is given to requests in a steady-state subscriber queue frorrisubscribers that are currently viewing a program over the new user access request;
wherein requests in the steady-state subscriber queue are ordered by time deadline.

2. The method of claim 1 wherein said another disk is up to three disks distant from disk d.

3. The method of claim 1 wherein, if said new user access request cannot be assigned to another disk, waiting a predefined period of time; and
assigning the new user access request to disk d.

4. In a video on demand system comprising a plurality of disks, where video information is striped across the plurality of disks, a method of accessing the video information comprising:
receiving a user access request for a next portion of video information required to present a streaming video sequence to the user;
assigning the user access request to a disk d of the plurality of disks that contains the next portion of video information;
determining when the user access request will be processed by examining extent size for said video information stored on disk d, wherein if the user access request will be processed within a predefined period of time, placing the user access request into a new user queue for disk d; otherwise, assigning the user access request to another disk of said plurality of disks;
wherein priority is given to requests in a stead-state subscriber queue form users that are currently viewing a program over new user access requests;
wherein requests in the steady-state subscriber queue are ordered by time deadline.

5. The method of claim 4 wherein said another disk is up to three disks distant from disk d.

6. The method of claim 4 wherein, if said user access request cannot be assigned to another disk, waiting a predefined period of time; and
assigning the user access request to disk d.

7. A system, comprising:
a plurality of disk drives;
a plurality of queues, including a steady-state subscriber queue for each disk drive to be used for a subscriber that is currently viewing a program, a new-subscriber queue for each disk drive for a subscriber that is beginning to view a program, and an other-request queue for each disk drive; and
a queue selector to determine which of the queues is to receive a next access request based on a priority of the next access request a highest priority being given to the subscriber that is currently viewing the program;
wherein a plurality of requests in the steady-state subscriber queue are ordered by time deadline.

8. A method, comprising:
assigning an access request to a new user queue, upon determining that with the new user queue selection all of a set of current steady-state queue requests will meet a predefined worst-case deadline, the new-subscriber queue being for subscribers that are beginning to view a program;
assigning the access request to an other-request queue, upon not assigning the access request to the new user queue and determining that with the other-request queue selection all of the set of current steady-state queue requests will meet the predefined worst-case deadline, the other-request queue being for subscribers that are beginning to view a program; and
assigning the access request to a steady-state queue, upon not assigning the access request to either the new user queue or the other-request queue and determining that with the steady-state queue selection all of the set of current steady-state queue will meet the predefined worst-case deadline;
wherein the access requests in the steady-state queue are ordered by time deadline.

* * * * *

UNITED STATES PATENT AND TRADEMARK OFFICE
CERTIFICATE OF CORRECTION

| | | |
|---|---|---|
| PATENT NO. | : 7,165,140 B2 | Page 1 of 1 |
| APPLICATION NO. | : 10/663237 | |
| DATED | : January 16, 2007 | |
| INVENTOR(S) | : Robert C. Dandrea et al. | |

It is certified that error appears in the above-identified patent and that said Letters Patent is hereby corrected as shown below:

Item 75, Inventors, in line 3, delete "Princeton" and insert instead --Kendall Park--.

Sheet 4 of 14 of the drawings, FIG. 4, box 450, delete "DEADINE" and insert instead -- DEADLINE--.

Column 4, line 28, delete "ONSETS" and insert instead --ONSET™--; line 30, delete "ONSE™" and insert instead -- ONSET™--.

Column 5, line 5, delete "$251_n$" and insert instead --$252_n$--.

Column 7, line 37, delete "SSQ" and insert instead --SSQs--; line 48, delete "SS 5" and insert instead --SSQ--.

Column 10, line 64, delete "910 A" and insert instead --910A--; line 65, delete "910 B" and insert instead --910B--.

Column 13, line 54 (approx), delete " "$J_Q(n) - J_1(n)$" and insert instead --$J_Q(n) = J_1(n)$--.

Column 15, line 44 (approx), delete "$T_Q=19^{8h}$" and insert instead --$T^{sh}_Q=19$--; line 46 (approx), delete "$T_Q=19^{sh}$" and insert instead --$T^{sh}_Q=19$--.

Column 16, line 5, after "deadlines" insert --.--.

Column 17, line 24, delete "frorrisubscribers" and insert instead --from subscribers--.

Column 18, line 1, in claim 4, delete "stead-state" and insert instead --steady-state--; line 22, delete "request" and insert instead --request,--.

Signed and Sealed this

Twenty-eighth Day of August, 2007

JON W. DUDAS
*Director of the United States Patent and Trademark Office*